United States Patent
Puggelli et al.

(10) Patent No.: US 10,243,457 B2
(45) Date of Patent: Mar. 26, 2019

(54) FEEDBACK CONTROL FOR EFFICIENT HIGH-SPEED BATTERY CHARGING

(71) Applicant: Lion Semiconductor Inc., San Francisco, CA (US)

(72) Inventors: Alberto Alessandro Angelo Puggelli, Burlingame, CA (US); Thomas Li, Mountain View, CA (US); Hans Meyvaert, Oakland, CA (US); Bertram J. Rodgers, San Francisco, CA (US); Zhipeng Li, Fremont, CA (US); Wonyoung Kim, Berkeley, CA (US)

(73) Assignee: Lion Semiconductor Inc., San Francisco, CA (US)

( * ) Notice: Subject to any disclaimer, the term of this patent is extended or adjusted under 35 U.S.C. 154(b) by 0 days.

(21) Appl. No.: 15/801,241

(22) Filed: Nov. 1, 2017

(65) Prior Publication Data
US 2018/0123453 A1     May 3, 2018

Related U.S. Application Data

(60) Provisional application No. 62/416,028, filed on Nov. 1, 2016.

(51) Int. Cl.
| | |
|---|---|
| *H02M 3/155* | (2006.01) |
| *H02M 3/07* | (2006.01) |
| *G05F 3/02* | (2006.01) |
| *G05F 3/04* | (2006.01) |
| *H02J 7/00* | (2006.01) |
| *H02M 1/08* | (2006.01) |
| *H02M 1/00* | (2006.01) |

(52) U.S. Cl.
CPC .............. *H02M 3/07* (2013.01); *G05F 3/02* (2013.01); *H02J 7/007* (2013.01); *H02J 7/0052* (2013.01);
(Continued)

(58) Field of Classification Search
CPC ...... H02M 3/155; H02M 3/07; H02M 1/4208; H02M 1/4225; H02M 2003/072;
(Continued)

(56) References Cited

U.S. PATENT DOCUMENTS

| | | | | |
|---|---|---|---|---|
| 2008/0292113 | A1* | 11/2008 | Tian | ............... H03G 5/005 381/98 |
| 2009/0322304 | A1* | 12/2009 | Oraw | ............... H02J 1/102 323/312 |

(Continued)

OTHER PUBLICATIONS

International Search Report and Written Opinion dated Jan. 19, 2018 in PCT/US2017/059593.

*Primary Examiner* — Adolf Berhane
*Assistant Examiner* — Sisay G Tiku
(74) *Attorney, Agent, or Firm* — Byrne Poh LLP

(57) ABSTRACT

A voltage regulator system, comprising: a switched capacitor (SC) regulator that operates at a switching frequency and receives an input voltage; and a controller configured to control an operation of the SC regulator by adjusting the switching frequency of the SC regulator based on efficiency. In some embodiments, the switching frequency is swept to determine a best efficiency. In some embodiments, the switching frequency is swept at each of a plurality of values for the input voltage. In some embodiments, the system includes further one or more switches in series with the SC regulator. In some embodiments, the SC regulator includes an output terminal that is coupled to a battery.

5 Claims, 23 Drawing Sheets

(52) U.S. Cl.
CPC ............. *H02M 1/08* (2013.01); *H02M 3/155* (2013.01); *H02J 2007/0059* (2013.01); *H02M 2001/0045* (2013.01)

(58) Field of Classification Search
CPC ...... H02M 2003/073; G05F 3/02; G05F 3/04; H02J 7/0072; H02J 7/02; H02J 7/04; H02J 7/007
See application file for complete search history.

(56) References Cited

U.S. PATENT DOCUMENTS

| | | |
|---|---|---|
| 2010/0080023 A1 | 4/2010 | Jain |
| 2010/0156369 A1* | 6/2010 | Kularatna ................. G05F 1/46 323/282 |
| 2011/0154068 A1 | 6/2011 | Huang et al. |
| 2013/0328416 A1* | 12/2013 | Whitworth ............. H02J 17/00 307/149 |
| 2014/0006808 A1 | 1/2014 | Sizikov et al. |
| 2015/0097538 A1* | 4/2015 | Le ......................... H02M 3/158 323/271 |
| 2015/0180355 A1* | 6/2015 | Freeman ................. H02M 1/08 363/21.04 |
| 2016/0234901 A1* | 8/2016 | Delos Ayllon ..... H05B 33/0815 |
| 2016/0308443 A1* | 10/2016 | Crossley ................ H02M 1/14 |
| 2017/0133842 A1* | 5/2017 | Freeman .................. H02J 1/00 |
| 2017/0179715 A1* | 6/2017 | Huang .................... H02M 3/07 |
| 2017/0194864 A1* | 7/2017 | Le ......................... H02M 3/158 |
| 2017/0271873 A1* | 9/2017 | Huang .................... H02M 3/07 |
| 2017/0300079 A1* | 10/2017 | Puggelli ................... G05F 5/00 |
| 2018/0041060 A1* | 2/2018 | Walley .................. H02J 7/0045 |

\* cited by examiner

FEEDBACK CONTROL FOR EFFICIENT HIGH-SPEED BATTERY CHARGING

CROSS-REFERENCE TO RELATED APPLICATION

This application claims the benefit of U.S. Provisional Patent Application No. 62/416,028, filed Nov. 1, 2016, which is hereby incorporated by reference herein in its entirety.

OTHER RELATED APPLICATION

This application relates to, and incorporates by reference herein in its entirety, U.S. Provisional Application 62/399,588, titled "Efficient High-Speed Battery Charging," which was filed on Sep. 26, 2016.

TECHNICAL FIELD

The present disclosure relates to systems and methods for charging a battery.

BACKGROUND

There is a strong demand to reduce the size of electronic systems. The size reduction is especially desirable in mobile electronics where space is a premium, but is also desirable in servers that are placed in big data centers since it is important to squeeze in as many servers as possible in fixed-size real estate.

One of the largest components in electronic systems includes voltage regulators (also referred to as power regulators). Power regulators often include a large number of bulky off-chip components to deliver voltages to integrated chips, including processors, memory devices (e.g., a dynamic random-access memory (DRAM)), radio-frequency (RF) chips, WiFi combo chips, and power amplifiers. Therefore, it is desirable to reduce the size of the voltage regulators in electronic systems.

Power regulators include semiconductor chips, such as a DC-DC regulator chip, that deliver power from a power source (e.g., a battery) to an output load. The output load can include a variety of integrated chips (e.g., an application processor, a DRAM, a NAND flash memory) in an electronic device. To efficiently deliver power, a voltage regulator can use a "buck" topology. Such a regulator is referred to as a buck regulator (also referred to as a buck converter). A buck regulator transfers charge from the power source to the output load using an inductor. A buck regulator can use power switches to connect/disconnect the inductor to one of multiple voltages, thereby providing an output voltage that is a weighted average of the multiple voltages. A buck regulator can adjust the output voltage by controlling the amount of time the inductor is coupled to one of the multiple voltages.

Unfortunately, a buck regulator is not suitable for highly integrated electronic systems. The conversion efficiency of a buck regulator depends on the size of the inductor, in particular when the power conversion ratio is high and when the amount of current consumed by the output load is high. Because an inductor can occupy a large area and is bulky to integrate on-die or on-package, existing buck regulators often use a large number of off-chip inductor components. This strategy often requires a large area on the printed circuit board, which in turn increases the size of the electronic device. The challenge is exacerbated as mobile system-on-chips (SoCs) become more complex and need increasingly larger number of voltage domains to be delivered by the voltage regulator.

Furthermore, a buck regulator is not well suited for high-speed charging of a battery. High-speed charging generally requires the use of a high input voltage. The use of a high input voltage, in turn, requires the buck regulator to provide a high voltage conversion ratio ($V_{IN}/V_{OUT}$) to convert a high input voltage ($V_{IN}$) to an output voltage ($V_{OUT}$) that is suitable for batteries. Unfortunately, at a high voltage conversion ratio, the efficiency of the buck regulator is substantially low, and the buck regulator wastes a large amount of power through heat dissipation. The heat dissipated by the buck regulator may raise the operating temperature of devices within the electronic system, which could cause malfunctioning. Therefore, the buck regulator is not well suited for high-speed charging of a battery.

Instead of a buck regulator, a high-speed charging system may use a switched-capacitor regulator to charge the battery. A switched capacitor regulator is known to be efficient even at a high voltage conversion ratio as long as the voltage conversion ratio is a ratio of integer numbers.

SUMMARY

A voltage regulator system, comprising: a switched capacitor (SC) regulator that operates at a switching frequency and receives an input voltage; and a controller configured to control an operation of the SC regulator by adjusting the switching frequency of the SC regulator based on efficiency. In some embodiments, the switching frequency is swept to determine a best efficiency. In some embodiments, the switching frequency is swept at each of a plurality of values for the input voltage. In some embodiments, the system includes further one or more switches in series with the SC regulator. In some embodiments, the SC regulator includes an output terminal that is coupled to a battery.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter.

DETAILED DESCRIPTION

Figure 5:
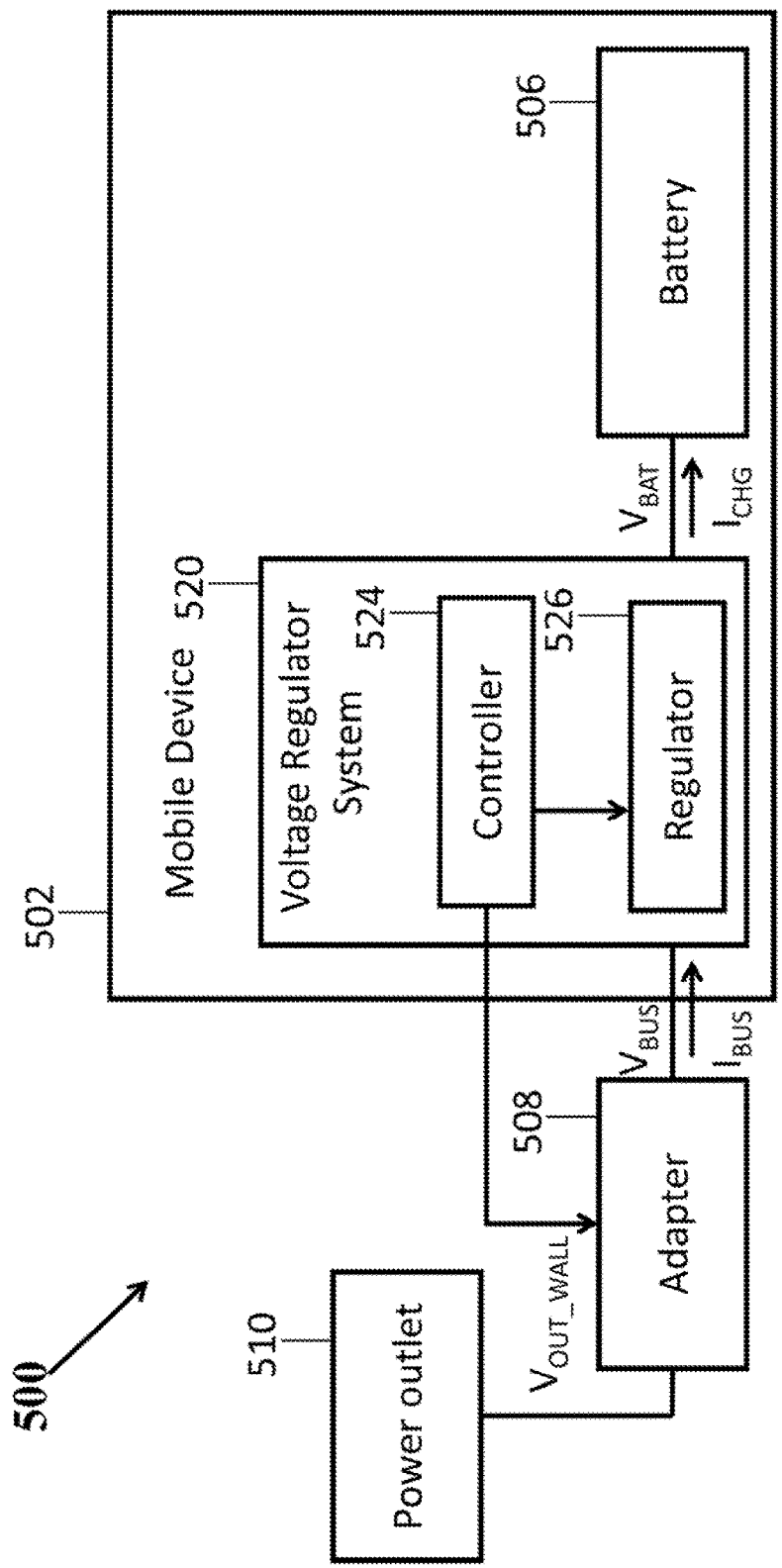
FIG. 5 depicts an example of a charger system according to certain embodiments of the present disclosure.

Fast battery charging is an important feature of mobile devices. FIG. 5 depicts a charging system 500 according to certain embodiments of the present disclosure. The charging system 500 includes a mobile device 502, a power outlet 510, and an adapter 508. The mobile device 502 includes, among other things, a voltage regulator system 520 and a battery 506. The voltage regulator system 520 includes, among other things, a controller 524 and a regulator 526. The regulator 526 is configured to provide power to the battery 506 so that the battery 506 is charged using the power provided by the regulator 526.

In some embodiments, the controller 524 is configured to regulate the operation of the regulator 526 to maintain a high efficiency. For example, in some embodiments, the controller 524 is configured to cause the adapter 508 to adjust the output voltage of the adapter 508. As discussed below, the controller 524 can also control/adjust certain parameters of the regulator 526.

In some embodiments, the regulator 526 includes a switched-capacitor (SC) regulator (also referred to as an SC converter). An SC regulator can use one or more capacitors to transfer charge from an input terminal (e.g., a power source) to an output terminal (e.g., an output load). An SC regulator can use power switches to couple/disconnect one or more capacitors to different voltage levels at different times, thereby providing an output voltage that is a weighted average of the multiple voltage levels. The SC regulator can control the output voltage by changing the configuration and the sequence in which capacitors are coupled to one another.

Figure 6:
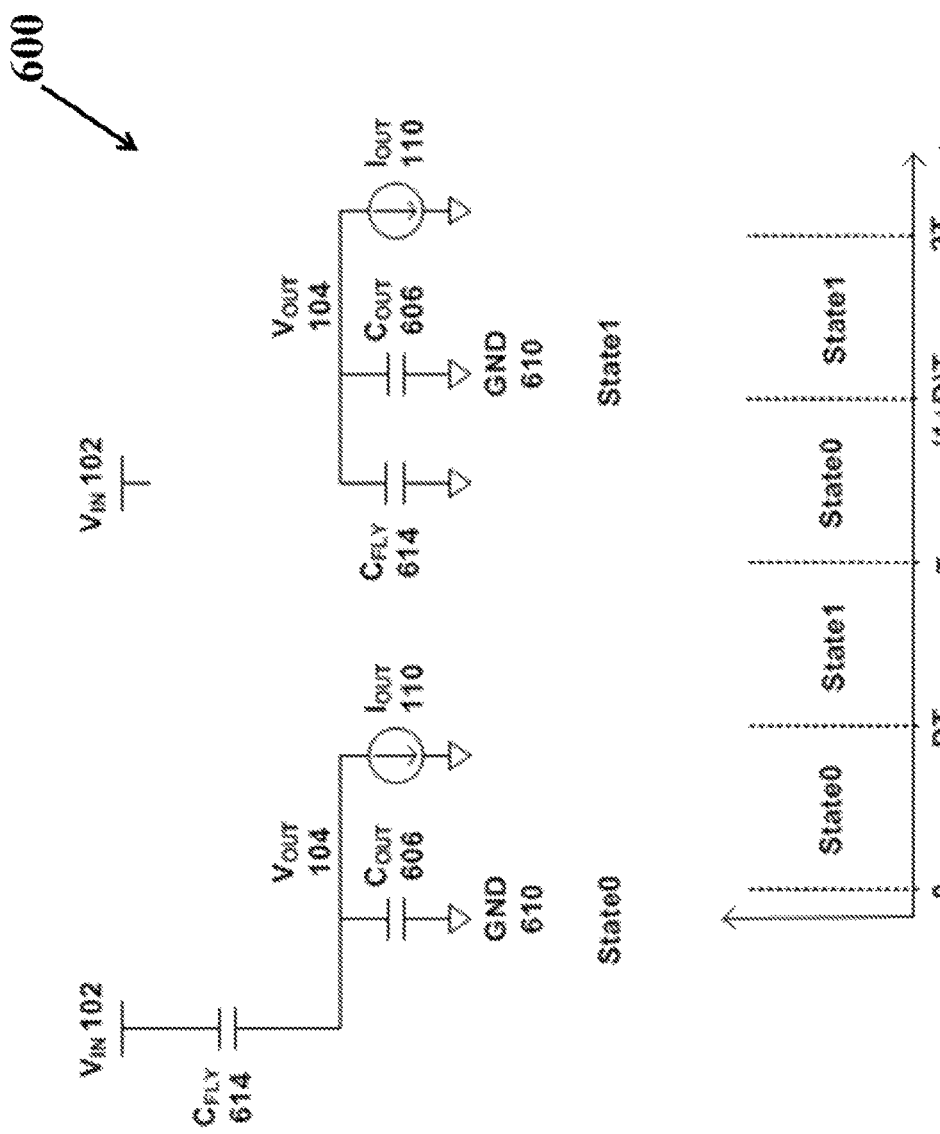
FIG. 6 shows an example of an SC regulator according to certain embodiments of the present disclosure.

FIG. 6 shows an example of a SC regulator in accordance with some embodiments. The SC regulator 600 can switch between two states, State0 and State1, using power switches. The switching frequency of the power switches can be denoted as $F_{SWITCH}$, where $F_{SWITCH}=1/T$.

Referring back to FIG. 5, the regulator 526 is configured to couple to the adapter 508. The adapter 508 is configured to receive a high AC input voltage (e.g., 110~220V) $V_{OUT\_WALL}$ from the power outlet 510 and convert $V_{OUT\_WALL}$ to a lower DC voltage $V_{BUS}$. The adapter 508 then provides the DC voltage $V_{BUS}$ to the voltage regulator 526 through an interface, such as a USB port. The adapter 508 typically includes an AC/DC converter followed by a DC/DC converter.

The regulator 526 is configured to receive $V_{BUS}$ from the adapter 508 and provide an output voltage $V_{BAT}$. The output voltage $V_{BAT}$ (and the corresponding current $I_{CHG}$) is then routed to the battery 506 to charge the battery 506. The regulator 526 typically includes a DC/DC converter.

In some embodiments, the voltage regulator system 520 can be implemented as a single chip. The single chip can include a single die that includes both the controller 524 and the regulator 526 as disclosed herein. The single chip can include two or more dies where one die includes the controller 524 and another die includes the regulator 526. In other embodiments, the voltage regulator system 520 can include two or more chips where one chip includes the controller 524 and another chip includes the regulator 526.

In some embodiments, the controller 524 can be implemented as a software application running on a hardware processor. The software application can be stored in memory. The memory can be a non-transitory computer readable medium, flash memory, a magnetic disk drive, an optical drive, a programmable read-only memory (PROM), a read-only memory (ROM), or any other memory or combination of memories. The software can run on a hardware processor capable of executing computer instructions or computer code. The hardware processor might also be implemented in hardware using an application specific integrated circuit (ASIC), programmable logic array (PLA), field programmable gate array (FPGA), or any other integrated circuit. In some embodiments, the controller 524 can be implemented in hardware using an application specific integrated circuit (ASIC), programmable logic array (PLA), field programmable gate array (FPGA), or any other integrated circuit. For example, the controller 524 can be synthesized using hardware programming languages including Verilog, VHDL, and Bluespec.

In order to increase the charging speed of the battery, the regulator 526 needs to deliver a higher amount of power to the battery 506. Since the amount of power delivered by the regulator 526 is computed as the multiplication of the output voltage $V_{BAT}$ and the corresponding current $I_{CHG}$, the regulator 526 should increase either the output current $I_{CHG}$ or the output voltage $V_{BAT}$ in order to increase the charging speed.

Typically, the regulator 526 cannot control the output voltage $V_{BAT}$. The output voltage $V_{BAT}$ is typically determined by the battery, and in particular, the battery chemistry (e.g., Li-Ion), number of battery cells stacked, and the amount of charge that had been accumulated in the battery, also referred to as a charge state. For example, the output voltage $V_{BAT}$, which is equivalent to the voltage across the battery, is increased as the battery becomes more charged. A single stack Li-Ion battery typically has a battery voltage $V_{BAT}$ of 3-4.5V. Typically, the battery voltage is 3V when the battery is completely discharged, and the battery voltage is 4.5V when the battery is completely charged. The battery voltage can gradually increase from 3V to 4.5V as the battery is charged from 0% to 100%. Therefore, the regulator 526 cannot control the output voltage $V_{BAT}$. Hence, in order to increase the power delivered to the battery 506, the regulator 526 generally has to increase the output current $I_{CHG}$.

In order for the regulator 526 to deliver an increased amount of power (e.g., an increased amount of current $I_{CHG}$) to the battery 506, the regulator 526 should receive an increased amount of power from the adapter 508. This means that, in order to deliver an increased amount of power to the battery 506, the adapter 508 should also increase the output current $I_{BUS}$ and/or the output voltage $V_{BUS}$ provided to the regulator 526.

It is often challenging for the adapter 508 to increase the amount of output current $I_{BUS}$ because interface protocols for connecting the adapter 508 to the regulator 526 typically limit the amount of current that can flow through the interface compliant with the interface protocols. For example, Universal Serial Bus (USB) standards limit the amount of current flowing through a USB Type C interface to 3A. Moreover, for the adapter cable to withstand a large amount of current, the adapter cable should be made thicker, which, in turn, increases the cost of manufacturing the adapter cable. In fact, adapter cables actually became more expensive as the adapter cables are designed to accommodate higher current.

Instead of increasing the output current $I_{BUS}$, the adapter 508 could increase the output voltage $V_{BUS}$ to deliver an increased amount of power. However, such a strategy is not ideal when the regulator 526 uses a buck regulator. If the output voltage $V_{BUS}$ is increased, the regulator 526 needs to operate at a higher voltage conversion ratio to convert a large $V_{BUS}$ to $V_{BAT}$. Unfortunately, operating the regulator 526 at a high voltage conversion ratio is problematic when the regulator 526 uses a buck regulator because the efficiency of a buck regulator degrades as the conversion ratio (e.g., $V_{BUS}/V_{BAT}$) increases.

The reduced efficiency of a regulator 526 is highly problematic because it increases power dissipation. For example, the efficiency of a regulator 526 can be written as follows:

$$\text{Efficiency} = P_{OUT}/P_{IN} = (P_{IN} - P_{DISS})/P_{IN}$$

where $P_{IN}$ is the input power, $P_{OUT}$ is the output power, and $P_{DISS}$ is the power dissipated by the regulator 526. Based on this relationship, the amount of power dissipated by the regulator 526 can be derived as follows:

$$P_{IN} * \text{Efficiency} = P_{IN} - P_{DISS}$$

$$P_{DISS} = P_{IN} * (1 - \text{Efficiency})$$

When $V_{BUS}$ (the input voltage to the regulator 526) increases, the following two factors cause $P_{DISS}$ to increase as well: (1) $P_{IN}$ increases with a higher input voltage, which is $V_{BUS}$; and (2) the efficiency decreases with a higher conversion ratio.

The increased power dissipation ($P_{DISS}$) is a big problem for mobile devices because increased power dissipation leads to increased heat dissipation. There are strong restrictions on how hot the surface of a mobile device can be to protect users. Because mobile devices generally do not include a cooling mechanism, the heat dissipation budget is very tight. As a result, when the regulator 526 dissipates too much heat, the regulator 526 is designed to throttle the battery charging speed in order to reduce heat dissipation. This is undesirable for user experience.

Therefore, in order to maintain high speed charging under a tight thermal budget, there is a strong need to control the regulator 526 so that it is capable of maintaining a high efficiency at high input to output conversion ratios.

The present disclosure provides a control system that is configured to set the operating point of the regulator 526 to improve the efficiency. As described further below, there is a non-linear relationship between the efficiency of the regulator 526, the input voltage of the regulator 526, the switching frequency of the regulator 526, the duty cycle of the regulator 526, and the gate drive voltage of the switch of the regulator 526. Therefore, the disclosed control system is configured to adaptively determine the input voltage, switching frequency, duty cycle, and/or the gate drive voltage of the regulator 526 in order to improve the efficiency of the regulator 526. For example, throughout the disclosure, the techniques applied to adjusting switching frequency can be similarly applied to duty cycle and/or the gate drive voltage.

In some embodiments, the control system, which may include the controller 524 and/or the regulator 526, is configured to adaptively determine the input voltage, switching frequency, duty cycle, and/or the gate drive voltage of the regulator 526 by iteratively searching for the input voltage and switching frequency, duty cycle and/or gate drive voltage that improve the efficiency. For example, the control system can fix the input voltage, and subsequently identify the switching frequency that improves the efficiency for that fixed input voltage. This process can be performed for a plurality of input voltage levels until the control system identifies the input voltage and the switching frequency at which the efficiency is highest. Similarly, in another example, the control system can fix the switching frequency, and subsequently identify the input voltage that improves the efficiency for that fixed switching frequency. This process can be performed for a plurality of switching frequencies until the control system identifies the input voltage and the switching frequency at which the efficiency is highest. In some embodiments, the process described above can also adjust duty cycle of the regulator 526 rather than the switching frequency. For example, the control system can fix the input voltage, and subsequently identify the duty cycle that improves the efficiency for that fixed input voltage. This process can be performed for a plurality of input voltage levels until the control system identifies the input voltage and the duty cycle at which the efficiency is highest. Similarly, in another example, the control system can fix the duty cycle, and subsequently identify the input voltage that improves the efficiency for that fixed duty cycle. This process can be performed for a plurality of duty cycles until the control system identifies the input voltage and the duty cycle at which the efficiency is highest. In some embodiments, the process described above can also adjust gate drive voltage of the regulator 526 rather than the switching frequency. For example, the control system can fix the input voltage, and subsequently identify the gate drive voltage that improves the efficiency for that fixed input voltage. This process can be performed for a plurality of input voltage levels until the control system identifies the input voltage and the gate drive voltage at which the efficiency is highest. Similarly, in another example, the control system can fix the gate drive voltage, and subsequently identify the input voltage that improves the efficiency for that fixed gate drive voltage. This process can be performed for a plurality of gate drive voltages until the control system identifies the input voltage and the gate drive voltage at which the efficiency is highest.

Figure 1:
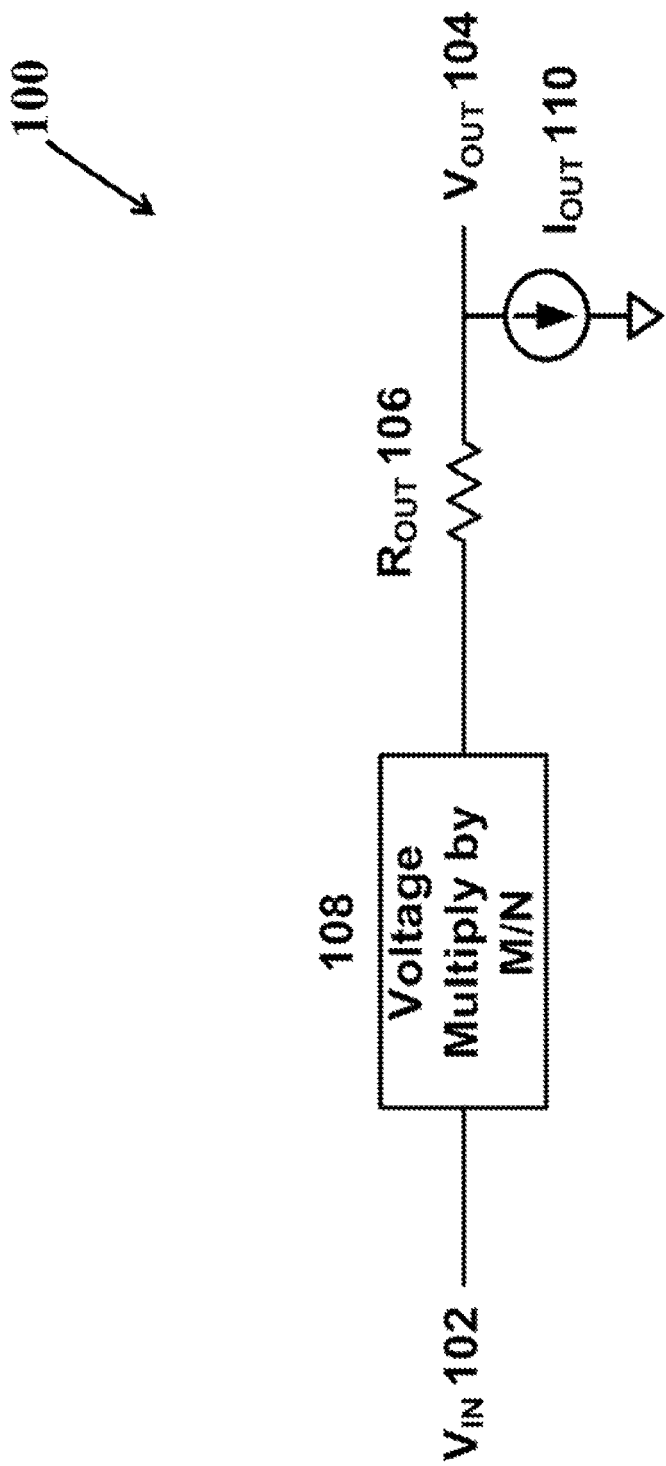
FIG. 1 illustrates an example of a model of a switched capacitor (SC) regulator according certain embodiments of the present disclosure.

There is a non-linear relationship between the efficiency of the regulator 526 and the input voltage of the regulator 526, the switching frequency of the regulator 526, the duty cycle of the regulator 526, and the gate drive voltage of the regulator 526. FIG. 1 illustrates a model 100 of a regulator 526. The regulator 526 can include, for example, an SC regulator. The SC regulator model 100 includes an input voltage $V_{IN}$ 102, an output voltage $V_{OUT}$ 104, an output resistor $R_{OUT}$ 106, a voltage multiplication ratio M/N 108, and an output current $I_{OUT}$ 110. The components included in the SC regulator model 100 can be further broken down into two or more components and/or combined together in any suitable arrangement. Further, one or more components can be rearranged, changed, added, and/or removed. In some embodiments, the $V_{IN}$ 102 corresponds to $V_{BUS}$, and the $V_{OUT}$ 104 corresponds to $V_{BAT}$.

Specifically, the SC regulator model 100 illustrated in FIG. 1 describes an N:M SC regulator. For example, if N is 2 and M is 1, the SC regulator model 100 describes a 2:1 SC regulator. The input voltage $V_{IN}$ 102 is multiplied by the voltage multiplication ratio M/N 108, which is followed by the output resistor $R_{OUT}$ 106. $R_{OUT}$ 106 can be adjusted by changing the switching frequency of the SC regulator, changing the duty cycle of the SC regulator, and/or changing the resistance of the power switches. The resistance of power switches can be adjusted by changing the gate drive voltage of the power switches or by changing the effective width of the power switches by dividing them into small switches that are connected in parallel, and turning on or off different numbers of the small switches. $R_{OUT}$ 106 is approximately proportional to $1/(Fswitch*(V_{GATE}-V_{TH}))$, where $V_{TH}$ is the threshold voltage of the power switch, and $V_{GATE}$ is the gate drive voltage of power switches. Based on the SC regulator model 100 in FIG. 1, $V_{OUT}=V_{IN}/N-R_{OUT} \times I_{OUT}$.

FIGS. 2A-2E illustrate how various SC regulator parameters change with a switching frequency $F_{SWITCH}$ 202 of an SC regulator according to certain embodiments of the present disclosure. FIGS. 2A-2D assume a fixed $I_{OUT}$ 110, and the solid curves correspond to a high $I_{OUT}$ 110, whereas the dotted curves correspond to a low $I_{OUT}$ 110. In some embodiments, the $I_{OUT}$ 110 can be ranging from 100 mA to 50 A or any other suitable ranges. Therefore, a ratio between a low $I_{OUT}$ 110 and a high $I_{OUT}$ 110 can be ranging between 1:10 and 1:100,000 or any other suitable ranges. Thus, the plots in FIGS. 2A-2D illustrate how curves shift when $I_{OUT}$ 110 increases or decreases.

Figure 2A:
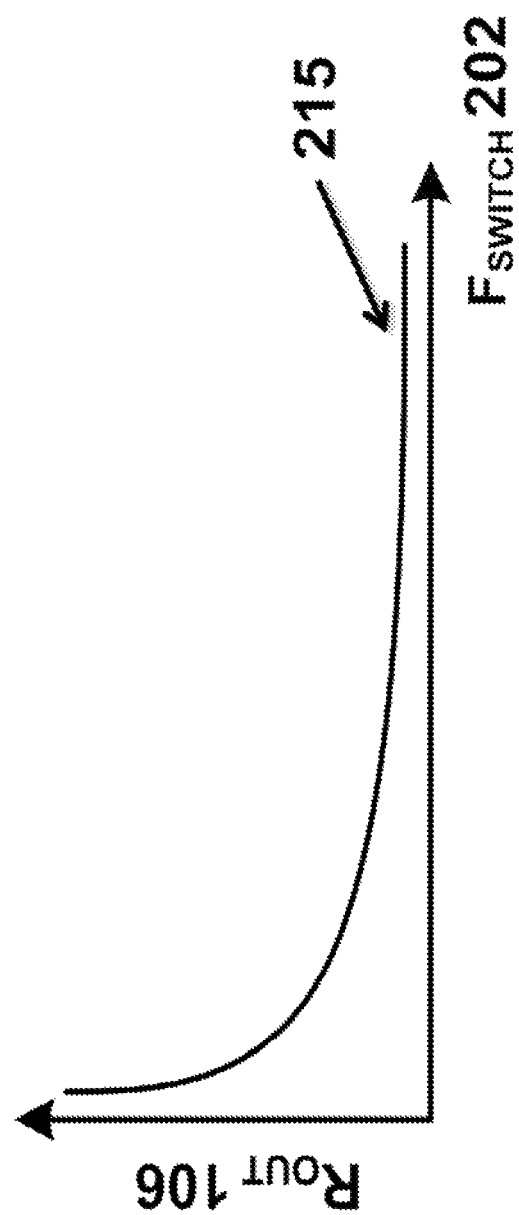
FIGS. 2A-2E illustrate examples of how various SC regulator parameters change with a switching frequency $F_{SWITCH}$ of an SC regulator according to certain embodiments of the present disclosure.

FIG. 2A depicts the relationship between the $R_{OUT}$ 106 and the $F_{SWITCH}$ 202. The x-axis is the $F_{SWITCH}$ 202, and the y-axis is the $R_{OUT}$ 106. As the $F_{SWITCH}$ 202 increases, the $R_{OUT}$ 106 decreases. Further, the $R_{OUT}$ 106 will be the same for a high $I_{OUT}$ 110 and a low $I_{OUT}$ 110, as suggested by curve 215.

Figure 2B:
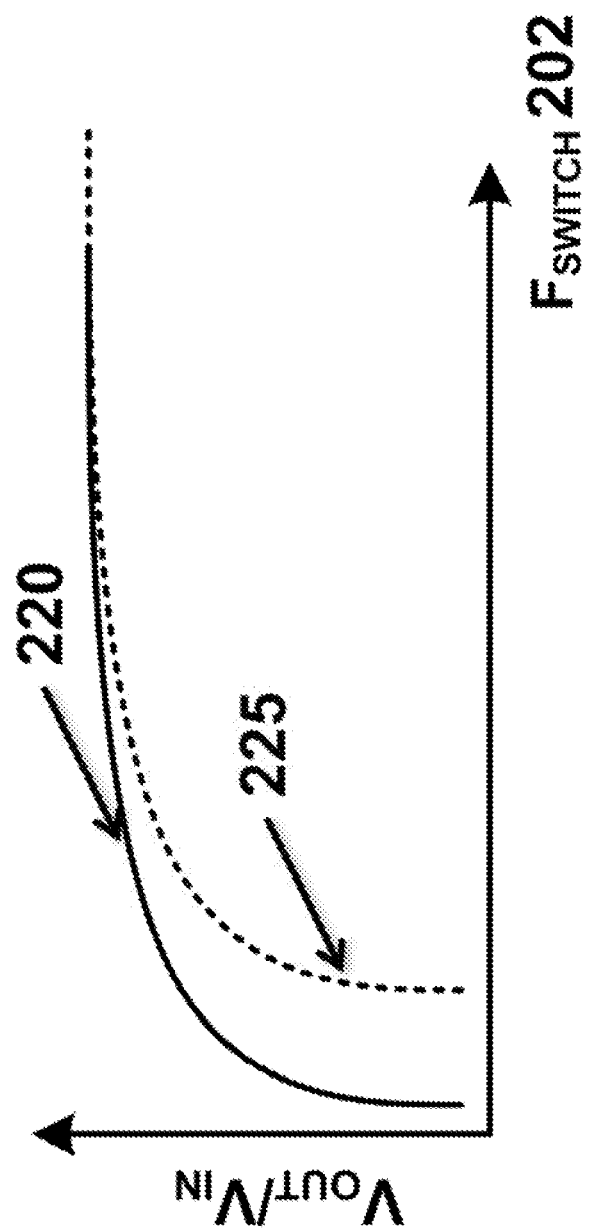

FIG. 2B depicts the relationship between $V_{OUT}/V_{IN}$ and the $F_{SWITCH}$ 202. The x-axis is the $F_{SWITCH}$ 202, and the y-axis is $V_{OUT}/V_{IN}$. Curve 220 corresponds to a high $I_{OUT}$ 110, and curve 225 corresponds to a low $I_{OUT}$ 110. As the $F_{SWITCH}$ 202 increases, $V_{OUT}/V_{IN}$ also increases.

Figure 2C:
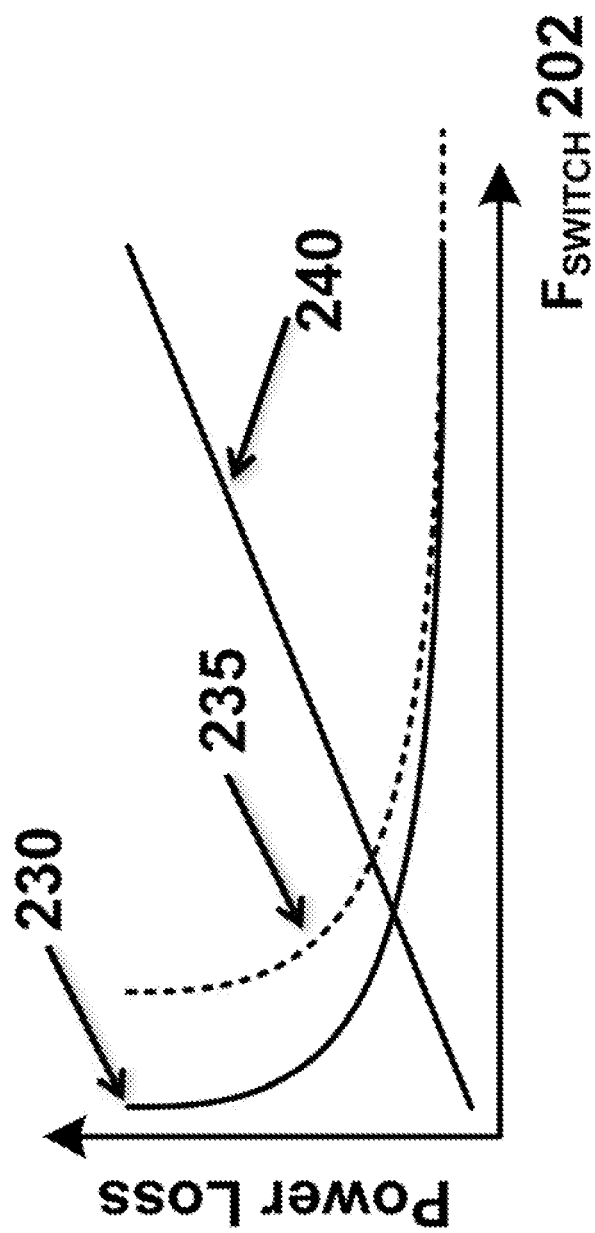

FIG. 2C depicts the relationship between power loss and the $F_{SWITCH}$ 202. The power loss can be defined as the difference between the input power and the output power. An ideal SC regulator in a charging system would deliver 100% of the input power to the output. In reality, however, there is some loss in the SC regulator, so only a portion of the input power is delivered to the output. The x-axis is the $F_{SWITCH}$ 202, and the y-axis is the power loss. Power loss can include resistive loss and switching loss. Curve 230 corresponds to resistive loss for a high $I_{OUT}$ 110, curve 235 corresponds to the resistive loss for a low $I_{OUT}$ 110, and curve 240 corresponds to switching loss for both a high $I_{OUT}$ 110 and a low $I_{OUT}$ 110. Resistive loss is the power loss that occurs when a current goes through a resistance (often undesired parasitic resistance). It is defined as $I^2R$, where I is the current and R is the resistance. Switching loss is the power loss that occurs when a capacitance needs to be charged (often undesired parasitic capacitance). When a power switch is turned on and off, the gate drive voltage needs to transition from one voltage to another, so the parasitic gate capacitance of the switch needs to be periodically charged and discharged, incurring switching loss. It is defined as $CV^2f$, where C is the parasitic capacitance, V is the amplitude of the voltage that charges and discharges the parasitic capacitance, and f is the frequency of charging and discharging. As the $F_{SWITCH}$ 202 increases, the switching loss increases, but the resistive loss decreases because the $R_{OUT}$ 106 decreases when the $F_{SWITCH}$ 202 increases. As a result, there is a tradeoff between the switching loss and the resistive loss, and there is an optimal $F_{SWITCH}$ 202 value that maximizes efficiency for a given $I_{OUT}$.

Figure 2D:
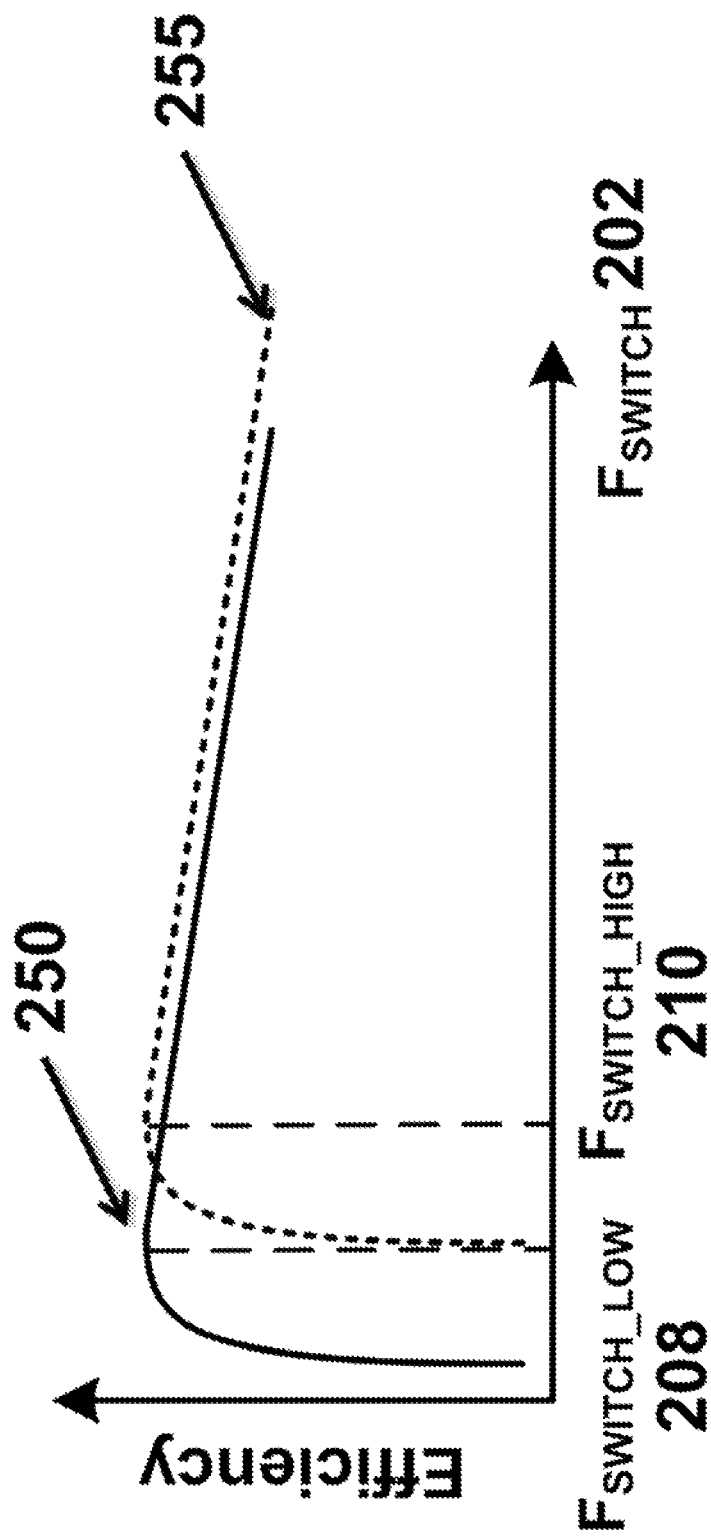

FIG. 2D depicts the relationship between efficiency and the $F_{SWITCH}$ 202. As discussed above, the efficiency of the SC regulator can be defined as:

$$\text{Efficiency}=P_{OUT}/P_{IN}=(P_{IN}-P_{DISS})/P_{IN},$$

where $P_{IN}$ is the input power, $P_{OUT}$ is the output power, $P_{DISS}$ is the power dissipated by the SC regulator. The x-axis is the $F_{SWITCH}$ 202, and the y-axis is the efficiency. Curve 250 corresponds to a high $I_{OUT}$ 110, and curve 255 corresponds to a low $I_{OUT}$ 110. When $I_{OUT}$ changes, some of the curves shift, changing the optimal $F_{SWITCH}$ 202 value. $F_{SWITCH}$ Low 208 and $F_{SWITCH\_HIGH}$ 210 are the optimal $F_{SWITCH}$ 202 values that maximize efficiency when the $I_{OUT}$ 110 is low and high, respectively. When the $I_{OUT}$ 110 is low, the optimal $F_{SWITCH}$ 202 value is small because switching loss dominates resistive loss. When $I_{OUT}$ is high, the optimal $F_{SWITCH}$ 202 value is large because resistive loss dominates switching loss.

Figure 2E:
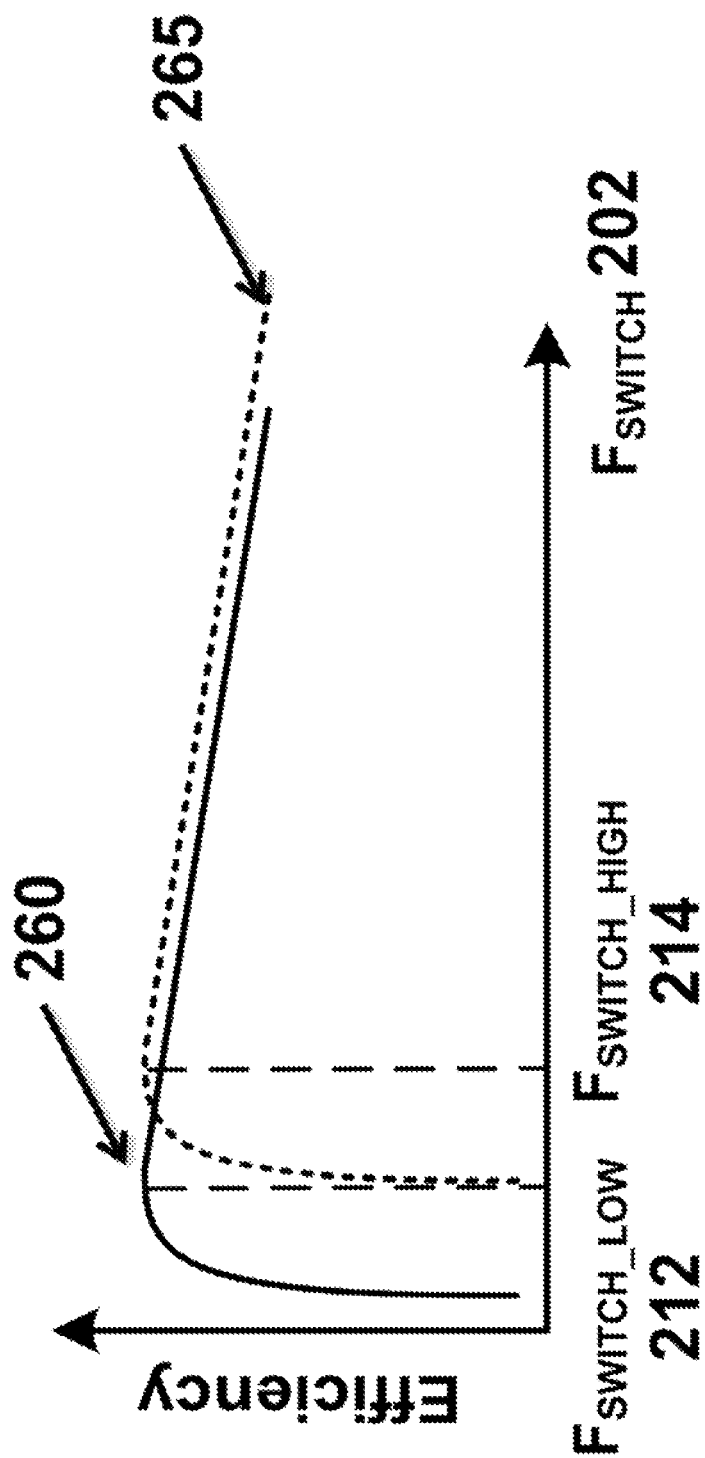

FIG. 2E depicts the relationship between efficiency and the $F_{SWITCH}$ 202 for a high $V_{IN}$ 102 and a low $V_{IN}$ 102. The x-axis is the $F_{SWITCH}$ 202, and the y-axis is the efficiency. Curve 260 corresponds to a high $V_{IN}$ 102, and curve 265 corresponds to a low $V_{IN}$ 102. Curves 260 and 265 illustrate how efficiency changes when $V_{IN}$ 102 is increasing or decreasing. For example, decreasing $V_{IN}$ 102 will shift the curve 260 to the right, and increasing $V_{IN}$ 102 will shift the curve 260 to the left.

Figure 12:
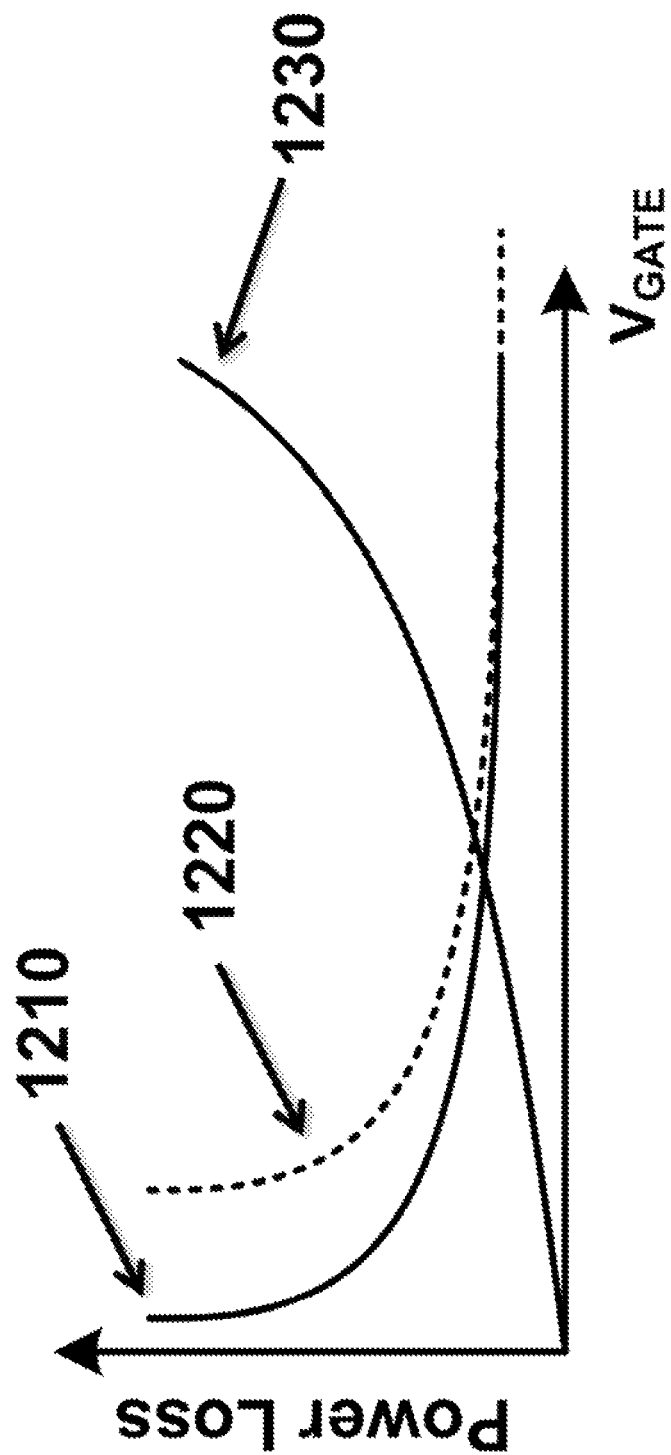
FIG. 12 illustrates an example of how power loss of an SC regulator changes with a gate drive voltage of an SC regulator according to certain embodiments of the present disclosure.

FIG. 12 depicts the relationship between power loss and the $V_{GATE}$. FIG. 12 assumes a fixed $I_{OUT}$ 110, and the solid curves correspond to a high $I_{OUT}$ 110, whereas the dotted curves correspond to a low $I_{OUT}$ 110. In some embodiments, the $I_{OUT}$ 110 can be ranging from 100 mA to 50 A or any other suitable ranges. Therefore, a ratio between a low $I_{OUT}$ 110 and a high $I_{OUT}$ 110 can be ranging between 1:10 and 1:100,000 or any other suitable ranges. Thus, the plot in FIG. 12 illustrates how curves shift when $I_{OUT}$ 110 increases or decreases.

The x-axis is the $V_{GATE}$, and the y-axis is the power loss. As described above, power loss can include resistive loss and switching loss. Curve 1210 corresponds to resistive loss for a high $I_{OUT}$ 110, curve 1220 corresponds to the resistive loss for a low $I_{OUT}$ 110, and curve 1230 corresponds to switching loss for both a high $I_{OUT}$ 110 and a low $I_{OUT}$ 110. Resistive loss is the power loss that occurs when a current goes through a resistance (often undesired parasitic resistance). It is defined as $I^2R$, where I is the current and R is the resistance. Switching loss is the power loss that occurs when a capacitance needs to be charged (often undesired parasitic capacitance). When a power switch is turned on and off, the gate drive voltage needs to transition from one voltage to another, so the parasitic gate capacitance of the switch needs to be periodically charged and discharged, incurring switching loss. It is defined as $CV^2f$, where C is the parasitic capacitance, V is the amplitude of the voltage that charges and discharges the parasitic capacitance, and f is the frequency of charging and discharging. As the $V_{GATE}$ increases, the switching loss increases, but the resistive loss decreases because the $R_{OUT}$ 106 decreases when the $V_{GATE}$ increases. As a result, there is a tradeoff between the switching loss and the resistive loss, and there is an optimal $V_{GATE}$ value that maximizes efficiency for a given $I_{OUT}$.

In addition, the parameters described in described in the y-axes of FIGS. 2A, 2B, 2D, and 2E will remain essentially the same when the x-axes are changed from $F_{SWITCH}$ to $V_{GATE}$.

FIGS. 13A-13E illustrate how various SC regulator parameters change with a duty cycle of an SC regulator according to certain embodiments of the present disclosure. FIGS. 13A-13D assume a fixed $I_{OUT}$ 110, and the solid curves correspond to a high $I_{OUT}$ 110, whereas the dotted curves correspond to a low $I_{OUT}$ 110. In some embodiments, the $I_{OUT}$ 110 can be ranging from 100 mA to 50 A or any other suitable ranges. Therefore, a ratio between a low $I_{OUT}$ 110 and a high $I_{OUT}$ 110 can be ranging between 1:10 and 1:100,000 or any other suitable ranges. Thus, the plots in FIGS. 13A-13D illustrate how curves shift when $I_{OUT}$ 110 increases or decreases.

Figure 13A:
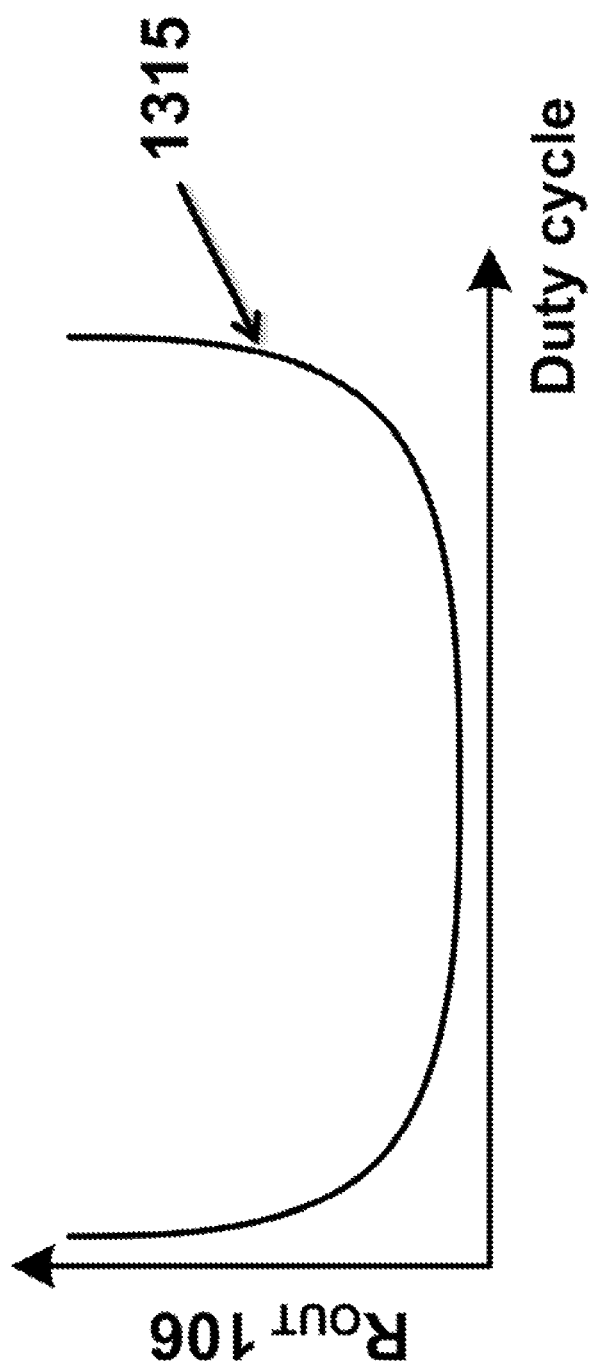
FIGS. 13A-13E illustrate examples of how various SC regulator parameters change with a duty cycle of an SC regulator according to certain embodiments of the present disclosure.

FIG. 13A depicts the relationship between the $R_{OUT}$ 106 and the duty cycle. The x-axis is the duty cycle, and the y-axis is the $R_{OUT}$ 106. As the duty cycle increases, the $R_{OUT}$ 106 first decreases then increases. Further, the $R_{OUT}$ 106 will be the same for a high $I_{OUT}$ 110 and a low $I_{OUT}$ 110, as suggested by curve 1315.

Figure 13B:
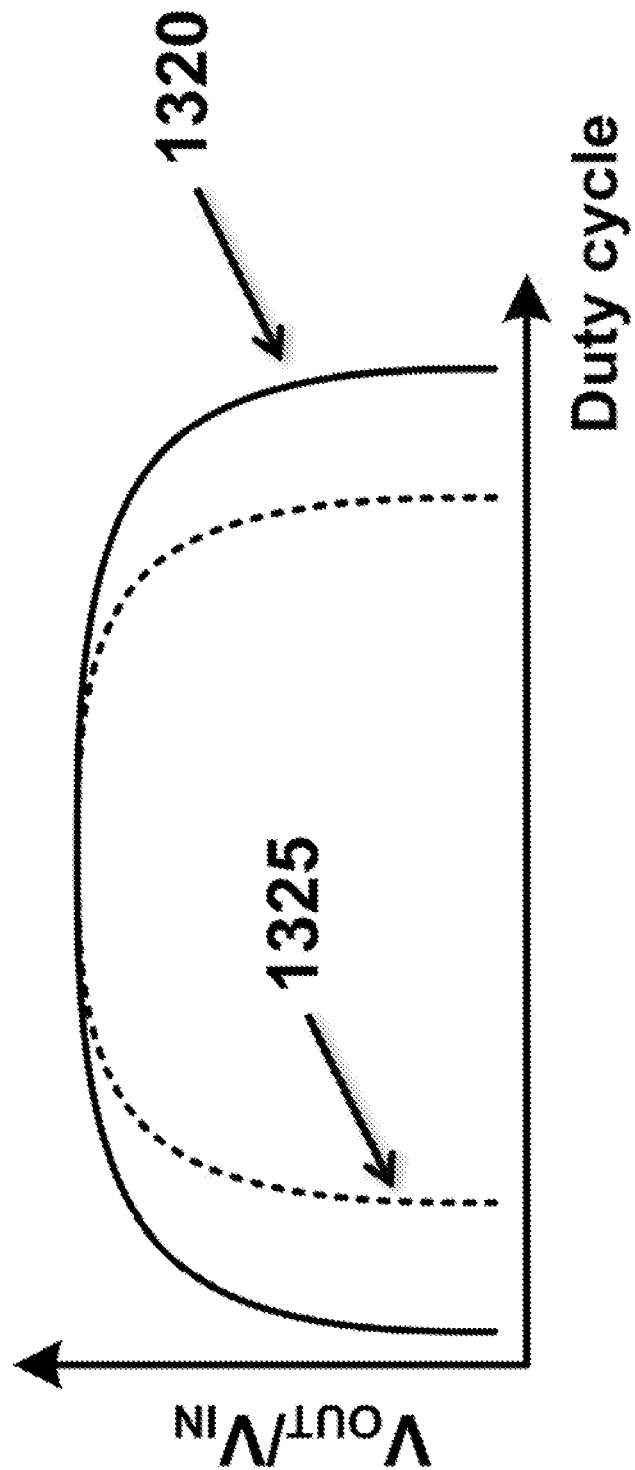

FIG. 13B depicts the relationship between $V_{OUT}/V_{IN}$ and the duty cycle. The x-axis is the duty cycle, and the y-axis is $V_{OUT}/V_{IN}$. Curve 1320 corresponds to a high $I_{OUT}$ 110, and curve 1325 corresponds to a low $I_{OUT}$ 110. As the duty cycle increases, $V_{OUT}/V_{IN}$ first increases then decreases.

Figure 13C:
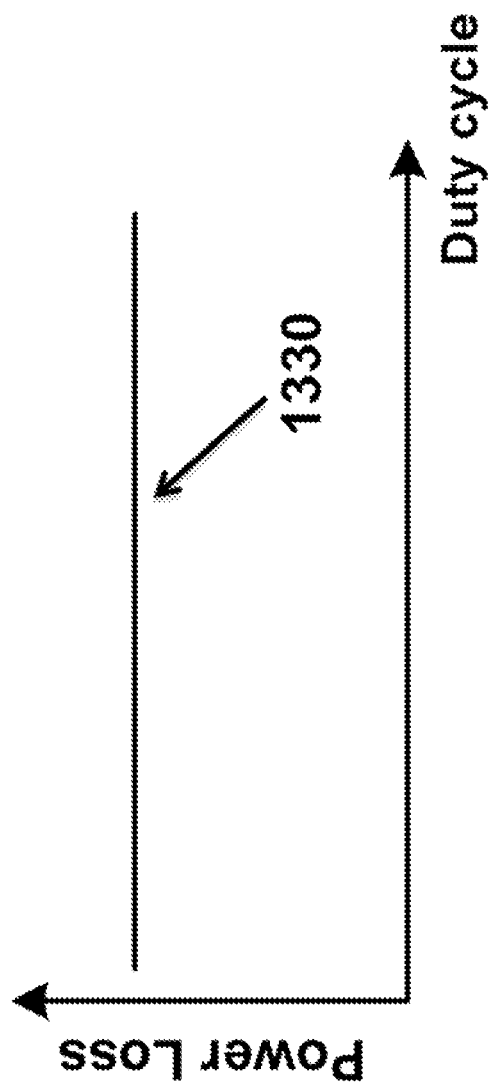

FIG. 13C depicts the relationship between power loss and the duty cycle. As suggested by curve 1330, the power loss is not affected by a change of duty cycle.

Figure 13D:
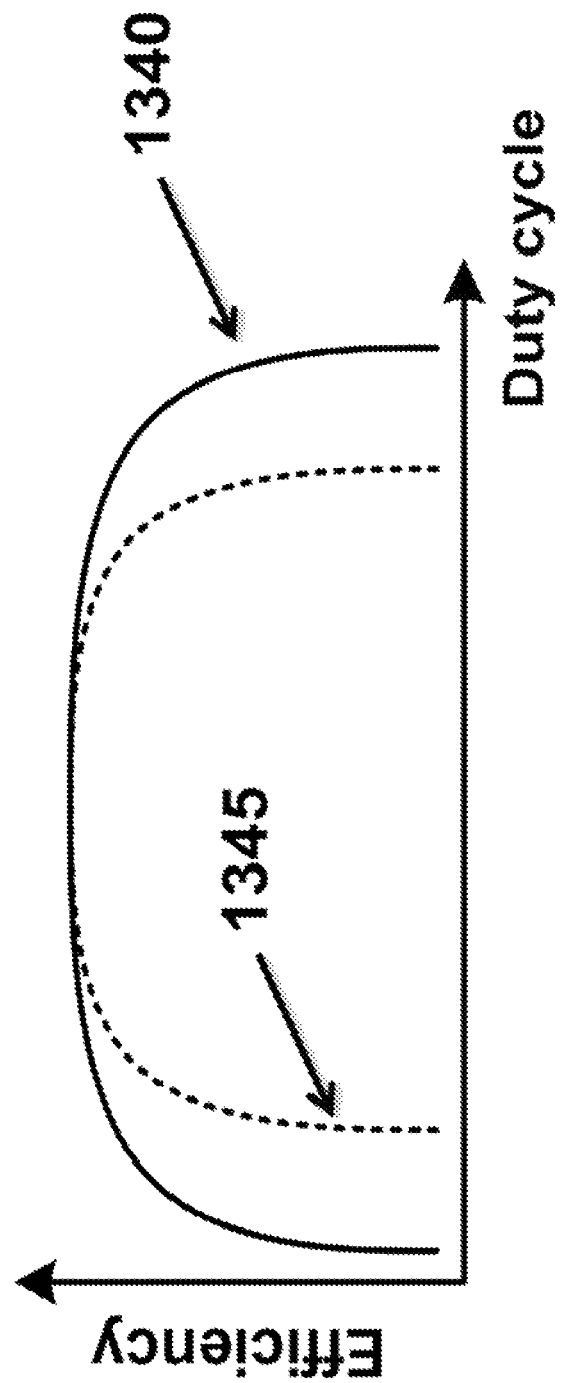

FIG. 13D depicts the relationship between efficiency and the duty cycle. As discussed above, the efficiency of the SC regulator can be defined as:

Efficiency=$P_{OUT}/P_{IN}$=$(P_{IN}-P_{DISS})/P_{IN}$, where $P_{IN}$ is the input power, $P_{OUT}$ is the output power, $P_{DISS}$ is the power dissipated by the SC regulator. The x-axis is the duty cycle, and the y-axis is the efficiency. Curve 1340 corresponds to a high $I_{OUT}$ 110, and curve 1345 corresponds to a low $I_{OUT}$ 110. As the duty cycle increases, the efficiency first increases then decreases.

Figure 13E:
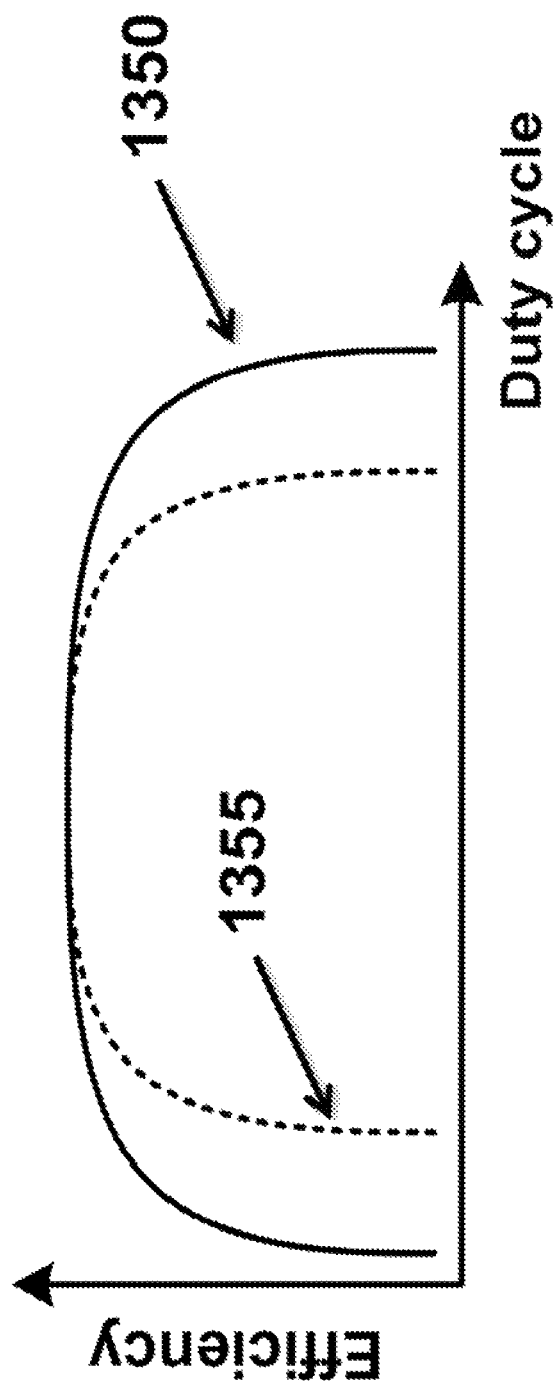

FIG. 13E depicts the relationship between efficiency and the duty cycle for a high $V_{IN}$ 102 and a low $V_{IN}$ 102. The x-axis is the duty cycle, and the y-axis is the efficiency. Curve 1350 corresponds to a high $V_{IN}$ 102, and curve 1355 corresponds to a low $V_{IN}$ 102. As the duty cycle increases, the efficiency first increases then decreases.

In an SC regulator used in a charging system, such as, for example, the one in FIG. 5, the $V_{OUT}$ 104 is fixed by the battery voltage, the $I_{OUT}$ 110 is set by the mobile device (how quickly to charge the battery), while the $V_{IN}$ 102 and the $F_{SWITCH}$ 202 are adjustable to maximize SC efficiency. Based on the plots in FIGS. 2A-2E, the charging system can pick a $F_{SWITCH}$ 202 value that maximizes efficiency for a given value of the $I_{OUT}$ 110. Once the $F_{SWITCH}$ 202 is determined, $V_{OUT}/V_{IN}$ is determined, such as illustrated in FIG. 2B. Since the $V_{OUT}$ 104 is fixed by the battery voltage, the $V_{IN}$ 102 can be set based on the determined $V_{OUT}/V_{IN}$ value. As a result, $F_{SWITCH}$ 202 and $V_{IN}$ 102 need to be determined together to maximize the efficiency. Similarly, as described above and as described in FIG. 12 and FIGS. 13A-13E, instead of changing the switching frequency, the duty cycle or the gate drive voltage can be changed with $V_{IN}$ 102 to maximize the efficiency. In some embodiments, the controller 524 can be configured to change various parameters, such as the switching frequency, the duty cycle, and the gate drive voltage of the SC regulator.

In some embodiments, the charging system can store the relationship between the efficiency, the switching frequency $F_{SWITCH}$ 202, the inverse voltage conversion ratio ($V_{OUT}/V_{IN}$), and/or the output current $I_{OUT}$ 110, as generally illustrated in FIGS. 2A-2E, using lookup tables.

In some embodiments, the charging system can store the relationship between the efficiency, the gate drive voltage, the inverse voltage conversion ratio ($V_{OUT}/V_{IN}$), and/or the output current $I_{OUT}$ 110, as generally illustrated in FIGS. 2A-2E and 12, using lookup tables.

In some embodiments, the charging system can store the relationship between the efficiency, the duty cycle, the inverse voltage conversion ratio ($V_{OUT}/V_{IN}$), and/or the output current $I_{OUT}$ 110, as generally illustrated in FIGS. 13A-13E, using lookup tables.

In some embodiments, the SC regulator 526 and/or controller 524 can be configured to determine the input voltage $V_{IN}$ 102 and the $F_{SWITCH}$ 202 to improve the efficiency of the charging system. As discussed in regard to FIGS. 2A-2E, the efficiency of the charging system depends on at least two variables: the input voltage $V_{IN}$ 102 and the switching frequency $F_{SWITCH}$ 202. Therefore, the SC regulator 526 and/or controller 524 can change the input voltage $V_{IN}$ 102 and the $F_{SWITCH}$ 202 to operate the charging system at an improved efficiency.

In some cases, the SC regulator 526 and/or controller 524 can be configured to determine the input voltage $V_{IN}$ 102 and the $F_{SWITCH}$ 202 by iteratively sweeping the values of the input voltage $V_{IN}$ 102 and the switching frequency $F_{SWITCH}$ 202. In some embodiments, the controller 524 can sweep the $V_{IN}$ 102 by adjusting the operation of the adapter 508.

Figure 3:
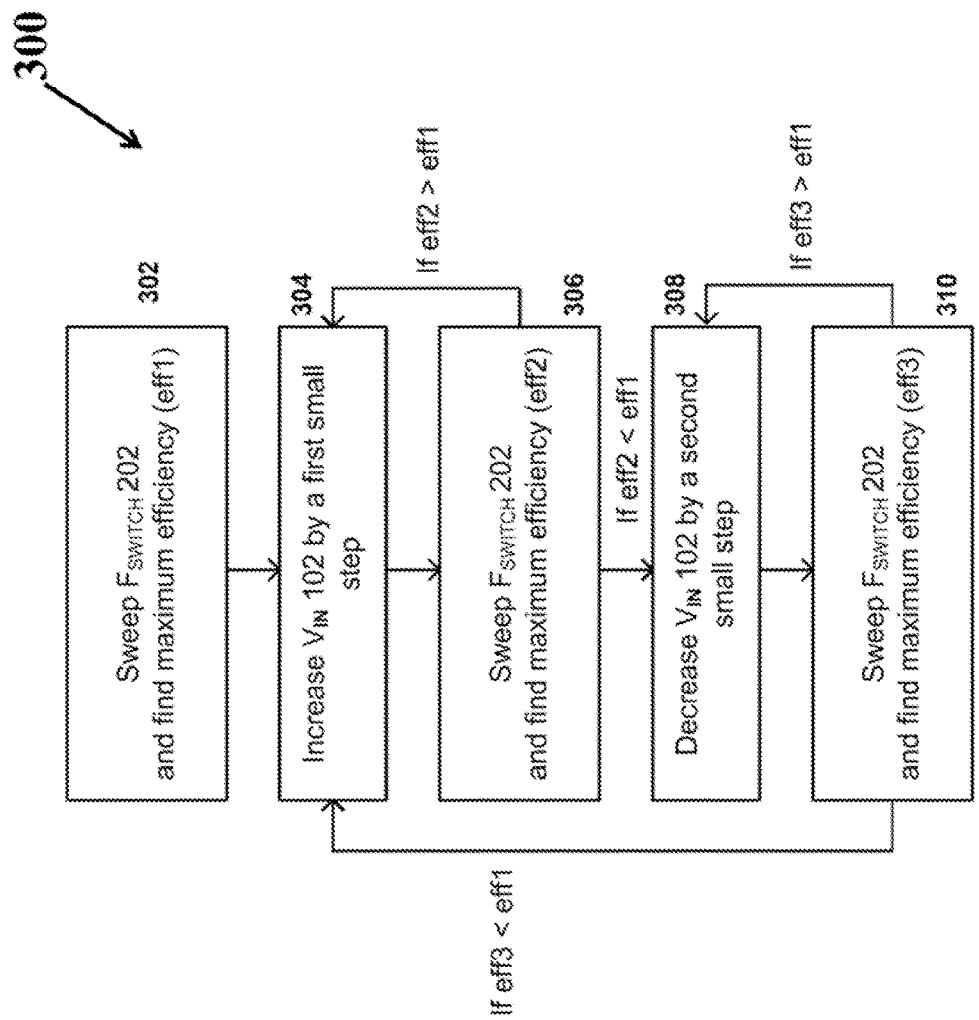
FIG. 3 illustrates an example of a process of how a voltage regulator system can adjust input voltage and switching frequency to find a maximum efficiency point according to certain embodiments of the present disclosure.

FIG. 3 illustrates a process 300 of how the SC regulator 526 and/or the controller 524 can adjust the $V_{IN}$ 102 and the $F_{SWITCH}$ 202 to improve the efficiency according to certain embodiments of the present disclosure. Although the process 300 is illustrated in connection with the SC regulator 526 and/or the controller 524, one or more components of the charging system 500 can be involved as well. In some embodiments, the process 300 can be modified by, for example, having steps rearranged, changed, added, and/or removed.

Process 300 shows how the SC regulator can sweep $F_{SWITCH}$ 202 and $V_{IN}$ 102 to find values that operate the SC regulator near or at the maximized efficiency. At step 302, the SC regulator 526 and controller 524 can start with a fixed $V_{IN}$ 102, and sweep $F_{SWITCH}$ 202 to find a first local optimum (eff1).

At step 304, the SC regulator 526 and/or controller 524 can increase $V_{IN}$ 102 by a first small step. The step can be a value between 1 mV to 2V, 0.1% to 50% of the initial voltage value, or any other suitable values.

At step 306, the SC regulator 526 and/or controller 524 can sweep $F_{SWITCH}$ 202 to find a second local optimum (eff2). If eff2 is higher than eff1, the process 300 can proceed to step 304, and the charger IC can repeat steps 304 and 306 until eff2 starts to drop. If eff2 is lower than eff1, the process 300 can proceed to step 308.

At step 308, the SC regulator 526 and/or controller 524 can decrease $V_{IN}$ 102 by a second small step. The first small step and the second small step can be the same or different.

At step 310, the SC regulator 526 and/or controller 524 can sweep $F_{SWITCH}$ 202 to find a third local optimum (eff3). If eff3 is higher than eff1, the process 300 can proceed to step 308, and the SC regulator 526 and controller 524 can repeat steps 308 and 310 until eff3 starts to drop. If eff3 is lower than eff1, the process 300 can proceed to step 304.

In some embodiments, process 300 can stop after 306 if eff2 equals eff1 and process 300 can stop after 310 if eff3 equals eff1. In some embodiments, two efficiencies can be considered to be equal if the two efficiencies are within a certain percentage of each other (e.g., 0.1%).

In some embodiment, in process 300, the SC regulator 526 and/or the controller 524 is configured to set an input voltage. Subsequently, given that input voltage, the control system is configured to sweep the switching frequency to identify the switching frequency at which the efficiency of the regulator 526 is highest. That efficiency is identified as the base efficiency. Subsequently, the SC regulator 526 and/or the controller 524 can identify the highest efficiencies at an input voltage slightly above and slightly below the input voltage associated with the base efficiency. These efficiencies are identified as a first efficiency and a second efficiency, respectively. The control system can identify the first efficiency and the second efficiency by sweeping the switching frequency while keeping the input voltage fixed.

If the base efficiency is greater than the first efficiency and the second efficiency, the SC regulator 526 and/or the controller 524 can be configured to operate the regulator 526 at the input voltage and the switching frequency associated with the base efficiency. If the first efficiency is greater than the base efficiency, then the SC regulator 526 and/or the controller 524 can update the base efficiency to be the first efficiency, and identify the highest efficiencies at an input voltage slightly above and slightly below the input voltage associated with the new base efficiency (i.e., the first efficiency). If the first efficiency is less than the base efficiency, but the second efficiency is higher than the base efficiency, then the SC regulator 526 and/or the controller 524 can update the base efficiency to be the second efficiency, and identify the highest efficiencies at an input voltage slightly above and slightly below the input voltage associated with the new base efficiency (i.e., the second efficiency). This process can be iterated until the SC regulator 526 and/or the controller 524 identifies the input voltage and the switching frequency at which the efficiency is the highest.

Figure 4:
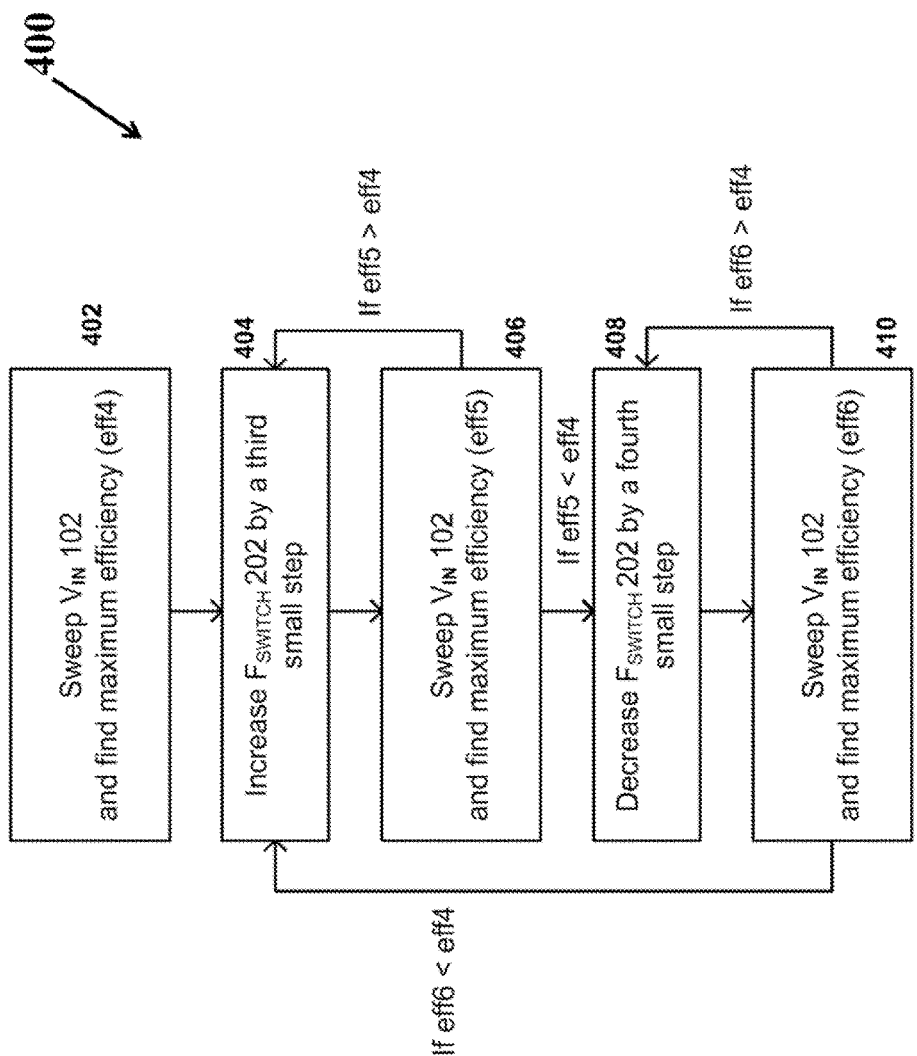
FIG. 4 illustrates an example of a process of how a voltage regulator system can adjust input voltage and switching frequency to find a maximum efficiency point according to certain embodiments of the present disclosure.

FIG. 4 illustrates a process 400 of how the charging system can adjust $V_{IN}$ 102 and $F_{SWITCH}$ 202 to find a maximum efficiency point according to certain embodiments of the present disclosure. Although the process 400 is illustrated in connection with the SC regulator 526 and/or the controller 524, one or more components of the charging system 500 can be involved as swell. In some embodiments, the process 400 can be modified by, for example, having steps rearranged, changed, added, and/or removed.

The process 400 is similar to the process 300 in that the process 400 also sweeps input voltages and switching frequencies to identify the input voltage and the switching frequency at which the efficiency is the highest. However, in process 400, unlike process 300, the SC regulator 526 and/or controller 524 can sweep the input voltage given a fixed switching frequency and iterate this step for several switching frequencies.

In some embodiments, the process 400 can start at step 402, where the SC regulator 526 and controller 524 can start with a fixed $F_{SWITCH}$ 202 and sweep $V_{IN}$ 102 to find a fourth local optimum (eff4).

At step 404, the SC regulator 526 and controller 524 can increase $F_{SWITCH}$ 202 by a third small step. The step can be a value between 1 kHz to 100 MHz, 0.1% to 50% of the initial frequency value, or any other suitable values.

At step 406, the SC regulator 526 and controller 524 can sweep $V_{IN}$ 102 to find a fifth local optimum (eff5). If eff5 is higher than eff4, the process 400 can proceed to step 404, and the charger IC can repeat steps 404 and 406 until eff5 starts to drop. If eff5 is lower than eff4, the process 400 can proceed to step 408.

At step 408, the SC regulator 526 and controller 524 can decrease $F_{SWITCH}$ 202 by a fourth small step. The third small step and the fourth small step can be the same or different.

At step 410, the SC regulator 526 and controller 524 can sweep $V_{IN}$ 102 to find a sixth local optimum (eff6). If eff6 is higher than eff4, the process 400 can proceed to step 408, and the SC regulator 526 and controller 524 can repeat steps 408 and 410 until eff6 starts to drop. If eff6 is lower than eff4, the process 400 can proceed to step 404.

In some embodiments, process 300 can stop after 306 if eff2 equals eff1 and process 300 can stop after 310 if eff3 equals eff1. In some embodiments, two efficiencies can be considered to be equal if the two efficiencies are within a certain percentage of each other (e.g., 0.1%).

In some embodiments, the SC regulator 526 and controller 524 can find the optimum $V_{IN}$ 102 and $F_{SWITCH}$ 202 values by initializing the process 300 or 400 using a value from a look-up table. For example, the lookup table can provide a good starting point so that the sweeps do not take too long to find the optimum $V_{IN}$ 102 and $F_{SWITCH}$ 202 values.

In some embodiments, the SC regulator 526 and controller 524 can adjust the gate drive voltage of power switches ($V_{GATE}$) instead of $F_{SWITCH}$ 202 to adjust $R_{OUT}$ 106. For examples, in processes 300 and 400 in connection with FIGS. 3 and 4, the SC regulator 526 and controller 524 can adjust the gate drive voltage of power switches ($V_{GATE}$) instead of $F_{SWITCH}$ 202. During the adjustment process, a small step of increase or decrease of the gate drive voltage could be 1% of the nominally rated voltage of the power switch device. For example, for a 5V power switch device, a small step of increasing or decreasing the gate drive voltage can be 50 mV. In some embodiment, any other suitable values can be used. Similar to $F_{SWITCH}$ 202, adjusting $V_{GATE}$ has a tradeoff between resistive loss and switching loss. Increasing $V_{GATE}$ increases switching loss, which is roughly $C \times V_{GATE}^2 \times F_{SWITCH}$, but reduces resistive loss since a higher gate drive reduces the on-state parasitic resistance of power switches. There is a difference between adjusting $V_{GATE}$ and $F_{SWITCH}$ 202. Switching loss is roughly proportional to $F_{SWITCH}$ 202, while it is roughly proportional to the square of $V_{GATE}$. Resistive loss and $R_{OUT}$ 106 are roughly proportional to $1/F_{SWITCH}$, while it is roughly proportional to $1/(V_{GATE}-V_{TH})$, where $V_{TH}$ is the transistor threshold voltage. Adjusting $V_{GATE}$ could need a separate power supply that generates $V_{GATE}$. Adjusting $F_{SWITCH}$ 202 could lead to noise problems in a mobile device if the frequency range is too wide and unpredictable. The SC regulator 526 and controller 524 can adjust the $V_{GATE}$ of one or more power switches.

Figure 7:
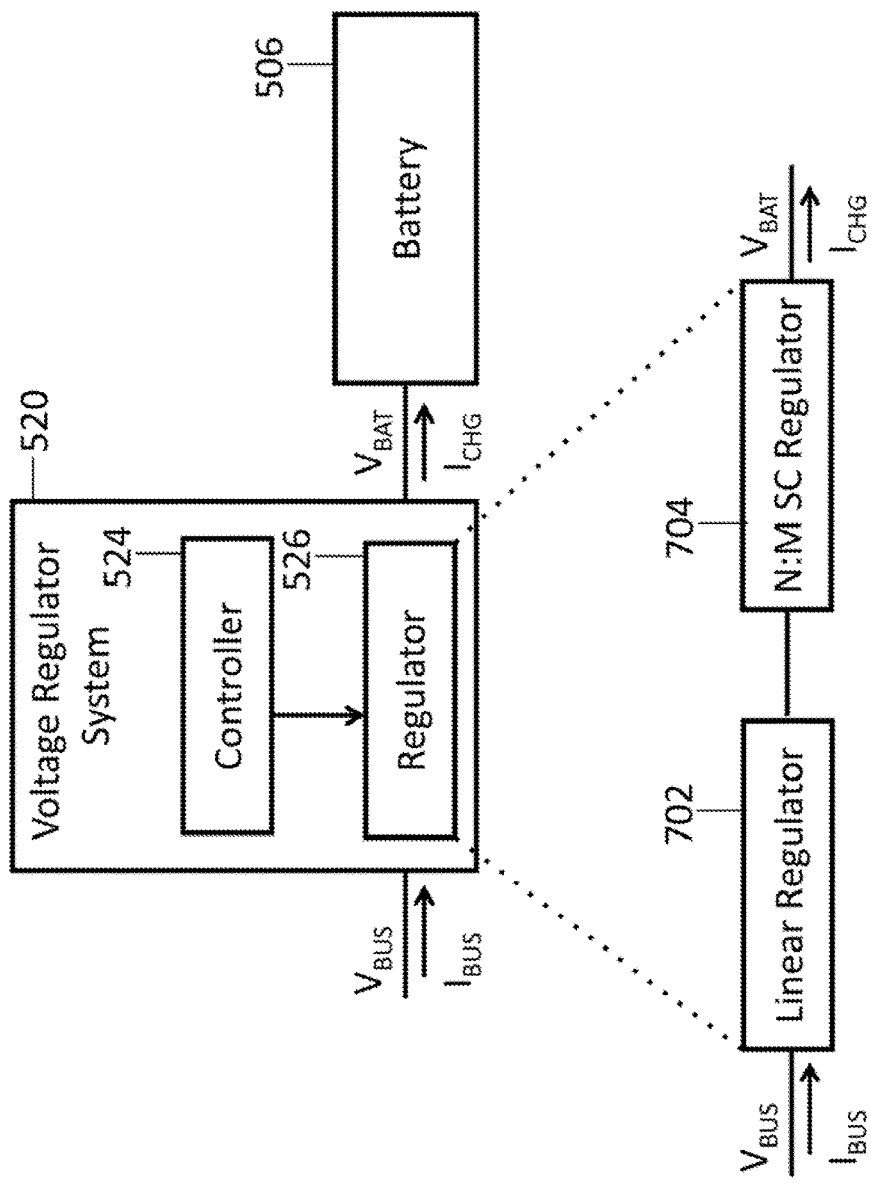
FIG. 7 illustrates an example showing that a linear regulator can be placed before an SC regulator according to certain embodiments of the present disclosure.
Figure 8:
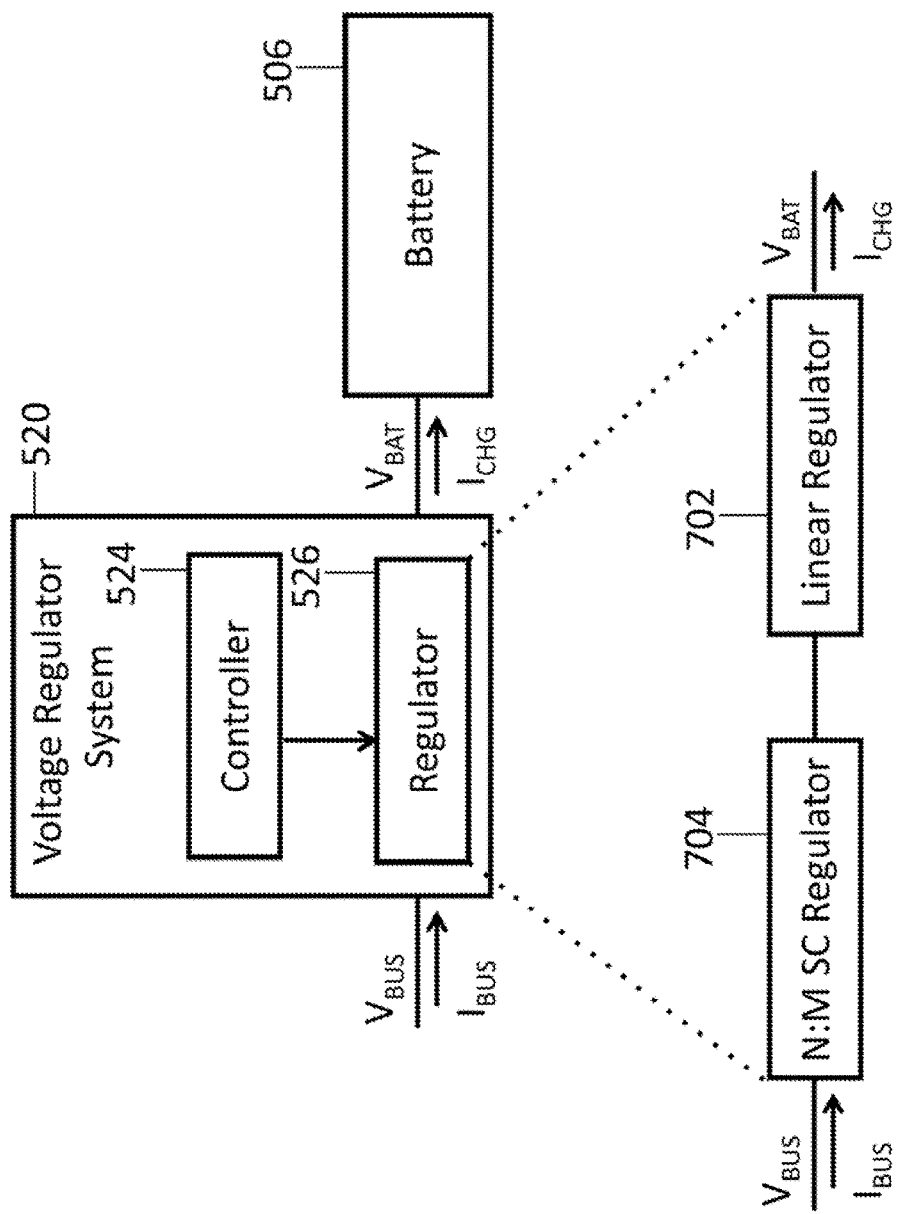
FIG. 8 illustrates an example showing that a linear regulator can be placed after an SC regulator according to certain embodiments of the present disclosure.

In some embodiments, the regulator 526 can operate in a fixed $F_{SWITCH}$ 202 and $V_{GATE}$, and include a linear regulator in series to regulate $R_{OUT}$ 106. FIG. 7 illustrates that a linear regulator 702 can be placed before an N:M SC regulator 704 according to certain embodiments of the present disclosure. FIG. 8 illustrates that a linear regulator 702 can be placed after an N:M SC regulator 704 according to certain embodiments of the present disclosure. In FIGS. 7 and 8, the N:M SC regulator 704 can be running in fixed frequency, and $R_{OUT}$ 106 can be regulated by the linear regulator.

In some embodiments, the linear regulator 702 and SC regulator 704 can be integrated in a single chip.

In some embodiments, the linear regulator 702 and SC regulator 704 can be separate chips.

In some embodiments, there is already a switch in series with the SC regulator and the gate drive voltage of the switch can be regulated just like a linear regulator.

In some embodiments, when sweeping frequencies, certain frequencies and/or frequency ranges can be skipped from being swept. This can be beneficial to prevent the sweep from interfering with signals for phone calls, WiFi, etc., and/or to prevent the sweep from causing audible noise.

Figure 9:
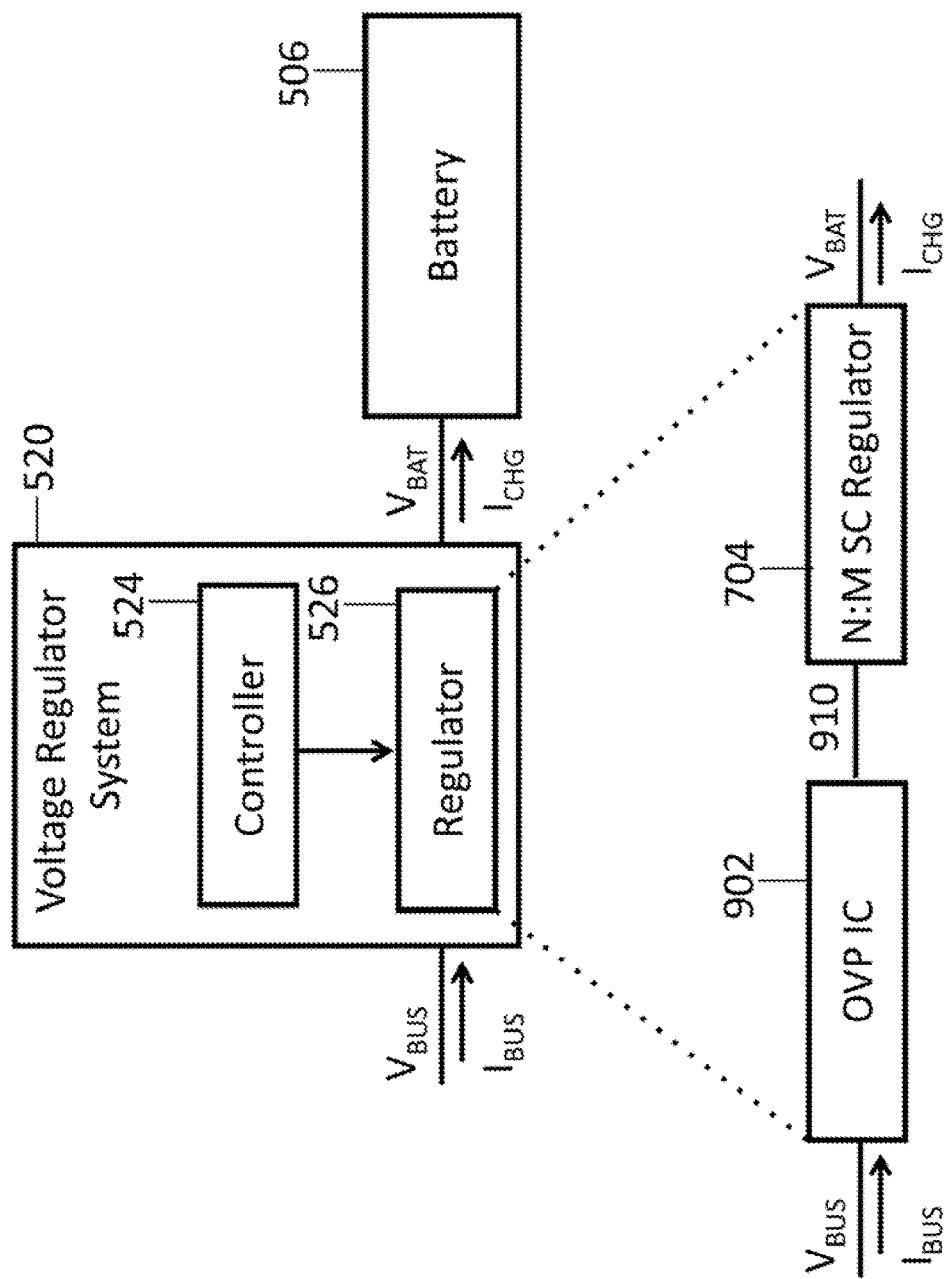
FIG. 9 illustrates an example showing that an over voltage protection (OVP) switch can be placed in front of an SC regulator according to some embodiments of the present disclosure.

FIG. 9 illustrates that an over voltage protection (OVP) switch 902 can be placed in front of the SC regulator 704 according to some embodiments of the present disclosure. The OVP switch 902 can be a single switch controlled by external signals. A signal from the controller 524 can adjust the on-state resistance of the OVP switch 902. In some embodiments, the SC regulator 704 have OVP ICs 902 in front to protect from sudden surge in an input voltage 910 of the SC regulator 704. By using the OVP IC to regulate $R_{OUT}$ 106, an additional linear regulator can be avoided in some embodiments.

Figure 10:
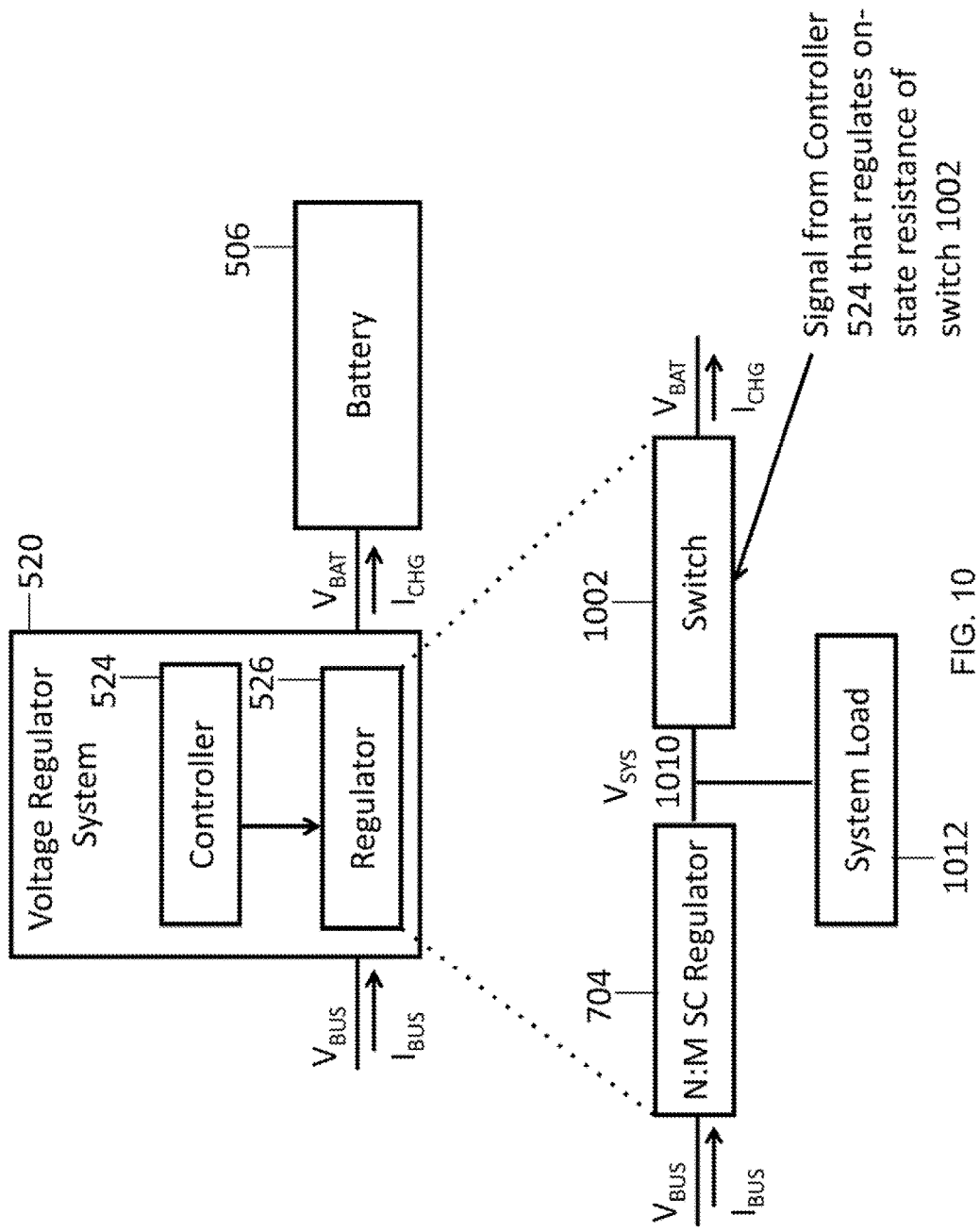
FIG. 10 illustrates an example showing that a switch can be placed after an SC regulator according to some embodiments of the present disclosure.

FIG. 10 illustrates that a switch 1002 can be placed after the SC regulator 704 according to some embodiments of the present disclosure. The switch 1002, sometimes called a BATFET or CHGFET (charge FET) can be there to separate the battery voltage (VSAT) and the system voltage ($V_{SYS}$) 1010. $V_{SYS}$ 1010 can be connected to the system load 1012 that can include various chips in the mobile device including power management IC, processor, RF communication chips, memory. The gate drive voltage of the switch 1002 can be adjusted to regulate $R_{OUT}$ 106. By using this switch 1002 to regulate $R_{OUT}$ 106, we can avoid using an additional linear regulator.

Instead of adjusting the gate drive voltage of a switch to regulate $R_{OUT}$ 106, in some embodiments, the OVP, or BATFET, or any switch in series with the SC regulator 704 can be partitioned into multiple switches. By adjusting how many partitions (switches) are turned on, the on-resistance of the switch changes, allowing a digitally controlled linear regulation.

Figure 11:
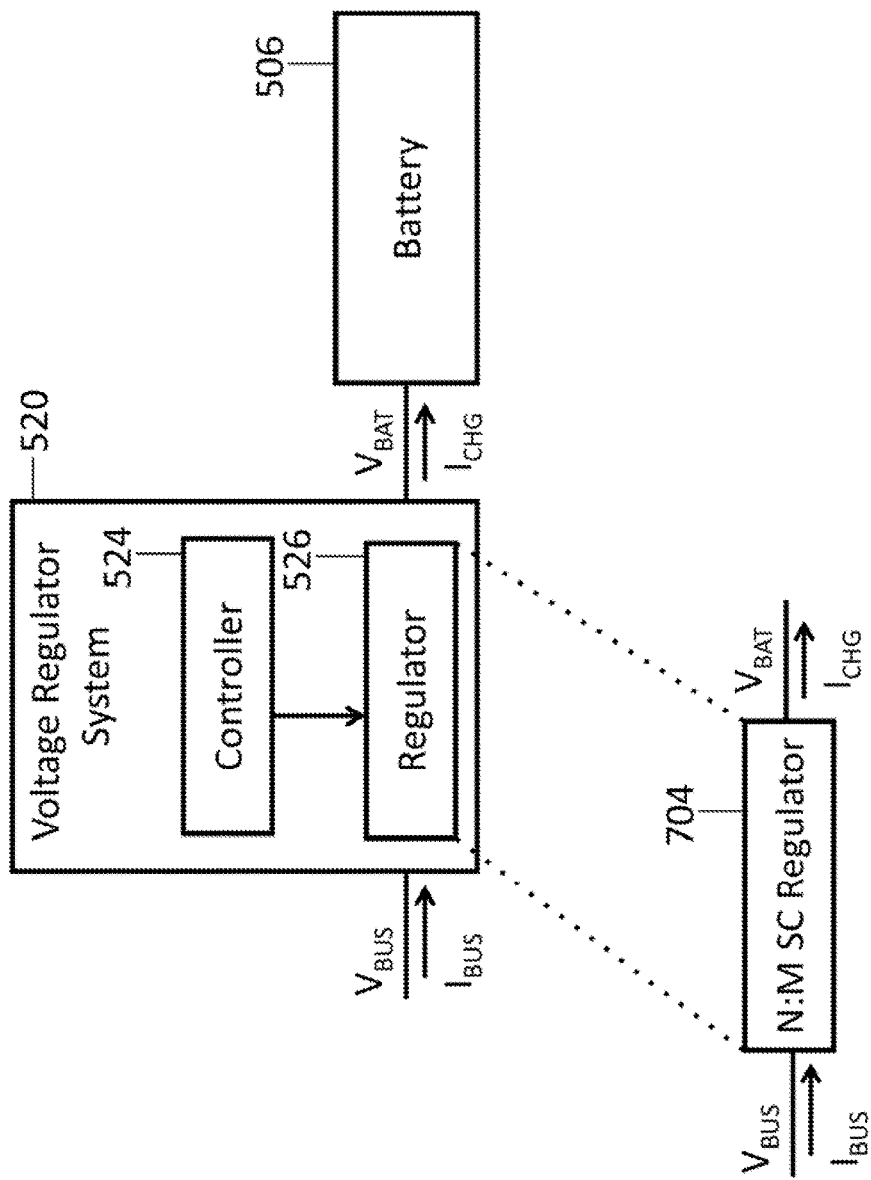
FIG. 11 illustrates an example of an SC regulator without an additional linear regulator according to certain embodiments of the present disclosure.

In some embodiments, the duty cycle of the SC regulator 704 can be used to regulate $R_{OUT}$ 106. For examples, in processes 300 and 400 in connection with FIGS. 3 and 4, the SC regulator 526 and controller 524 can adjust the duty cycle instead of $F_{SWITCH}$ 202. During the adjustment process, a small step of increase or decrease of the duty could be 1%, 10%, or any other suitable values. $R_{OUT}$ 106 is smallest when duty cycle is close to 50%, and the $R_{OUT}$ 106 increases as duty cycle deviates from 50%. For example, in some embodiments, the duty cycle can be defined as DT/T as illustrated in FIG. 6. As illustrated in FIG. 11, according to certain embodiments of the present disclosure, if $R_{OUT}$ 106 is regulated by adjusting the duty cycle, the regulator 526 can have only an N:M SC regulator 704 without the need for an additional linear regulator.

In some embodiments, a regulator 526 can be configured to turn on all the power switches that are between $V_{IN}$ 102 and $V_{OUT}$ 104, and turn off all power switches that are between $V_{OUT}$ 104 and ground to operate it as a 1:1 regulator. Since no or very few power switches are switching, the efficiency can be very high. Similar to the N:M SC regulator, $V_{GATE}$ can be adjusted to regulate the output. Support for this configuration can be useful if the user needs $V_{BUS}$ to be connected to $V_{BAT}$ for a certain test mode, or if the user has an adapter 508 that can only support a $V_{BUS}$ that is close to $V_{BAT}$.

In some embodiments, the OVP, BATFET, and SC regulator can be a single chip.

In some embodiments, the OVP, BATFET, and SC regulator can be separate chips inside a single charging system.

Figure 14:
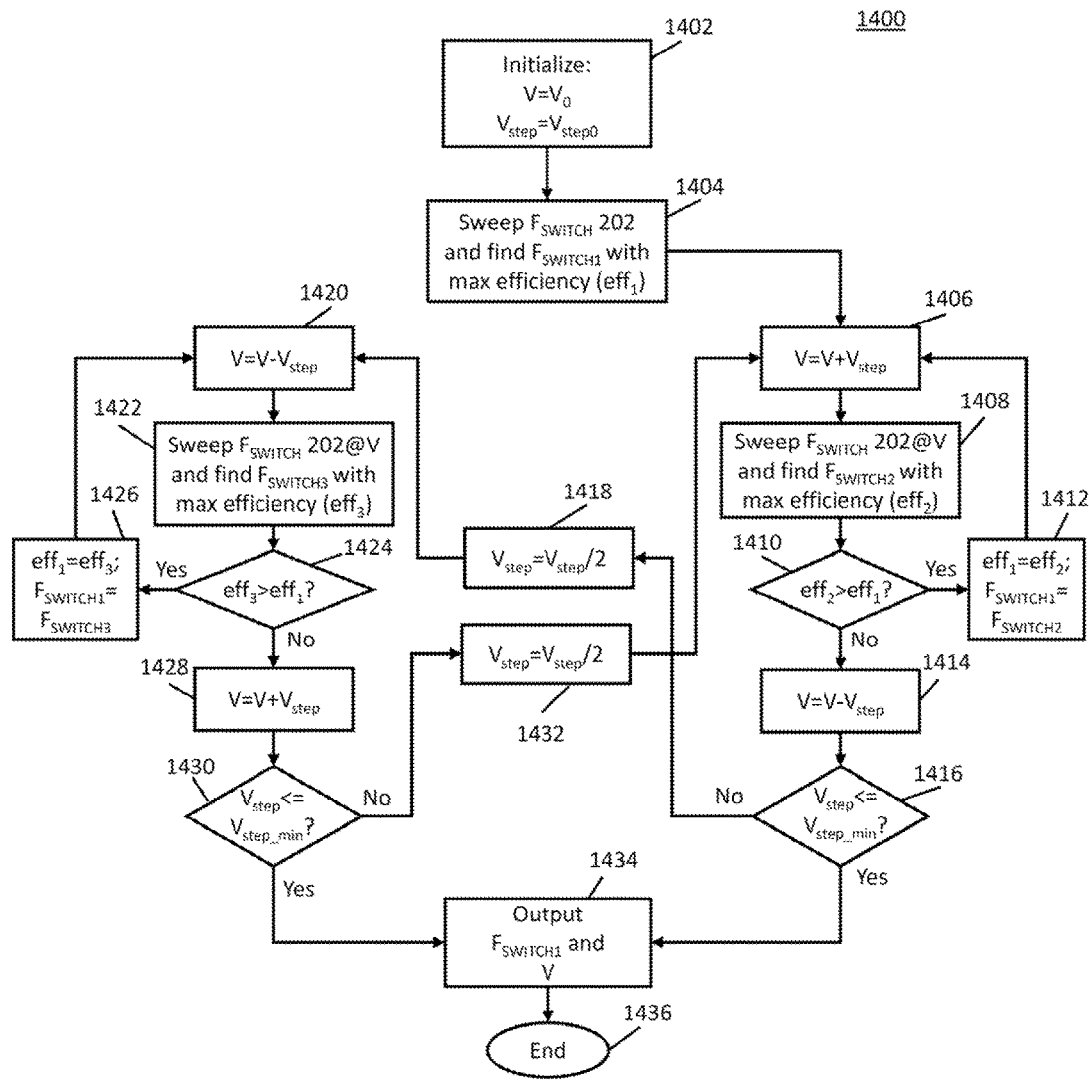
FIG. 14 shows an example of a diagram of a process for finding settings for V 102 and $F_{SWITCH}$ 202 by repeatedly setting values for V 102 and sweeping $F_{SWITCH}$ in accordance with some embodiments.

Turning to FIG. 14, an example 1400 of another process for finding values of V 102 and $F_{SWITCH}$ 202 based upon efficiency in accordance with some embodiments is shown. As illustrated, after the process begins, at 1402, the process can initialize V 102 to any suitable initial setting $V_0$ and set $V_{step}$ (a step at which V 102 will be changed) to any suitable initial setting $V_{step0}$.

Next, at 1404, the process can sweep $F_{SWITCH}$ 202 at V and find $F_{SWITCH1}$ with maximum efficiency (eff$_1$). Any suitable frequencies or ranges of frequencies can be swept, and, as described above, in some embodiments, one or more frequencies or frequency ranges can be excluded from the sweep (e.g., in order to prevent interference).

At 1406, the process can increase V 102 by $V_{step}$. Process 1400 can then sweep $F_{SWITCH}$ 202 at V and find $F_{SWITCH2}$ with maximum efficiency (eff$_2$) at 1408. Any suitable frequencies or ranges of frequencies can be swept, and, as described above, in some embodiments, one or more frequencies or frequency ranges can be excluded from the sweep (e.g., in order to prevent interference). Next, at 1410, the process can determine if eff2 is greater than eff$_1$. If so, the process can set eff$_1$ equal to eff$_2$ and set $F_{SWITCH1}$ equal to $F_{SWITCH2}$ at 1412, and then loop back to 1406. Otherwise, if at 1410, the process determines that eff$_2$ is not greater than eff$_1$, then the process can decrease V by $V_{step}$ at 1414. After 1414, at 1416, the process can determine whether $V_{step}$ is less than or equal to a minimum step for V ($V_{step\_min}$), which can have any suitable value (e.g., one at which the difference in V does not result in different performance). If at 1416, it is determined that $V_{step}$ is not less than or equal to $V_{step\_min}$, process 1400 can divide $V_{step}$ in half at 1418 and then branch to 1420.

At 1420, the process can decrease V 102 by $V_{step}$. Process 1400 can then sweep $F_{SWITCH}$ 202 at V and find $F_{SWITCH3}$ with maximum efficiency ($eff_3$) at 1422. Any suitable frequencies or ranges of frequencies can be swept, and, as described above, in some embodiments, one or more frequencies or frequency ranges can be excluded from the sweep (e.g., in order to prevent interference). Next, at 1424, the process can determine if $eff_3$ is greater than $eff_1$. If so, the process can set $eff_1$ equal to $eff_3$ and set $F_{SWITCH1}$ equal to $F_{SWITCH3}$ at 1426, and then loop back to 1420. Otherwise, if at 1424, the process determines that $eff_3$ is not greater than $eff_1$, then the process can increase V by $V_{step}$ at 1428. After 1428, at 1430, the process can determine whether $V_{step}$ is less than or equal to a minimum step for V ($V_{step\_min}$), which can have any suitable value (e.g., one at which the difference in V does not result in different performance). If at 1430, it is determined that $V_{step}$ is not less than or equal to $V_{step\_min}$, process 1400 can divide $V_{step}$ in half at 1432 and then branch back to 1406.

If it is determined at 1416 or 1430 that $V_{step}$ is less than or equal to $V_{step\_min}$, then the process can output $F_{SWITCH1}$ and V at 1434, and then end at 1436.

Figure 15:
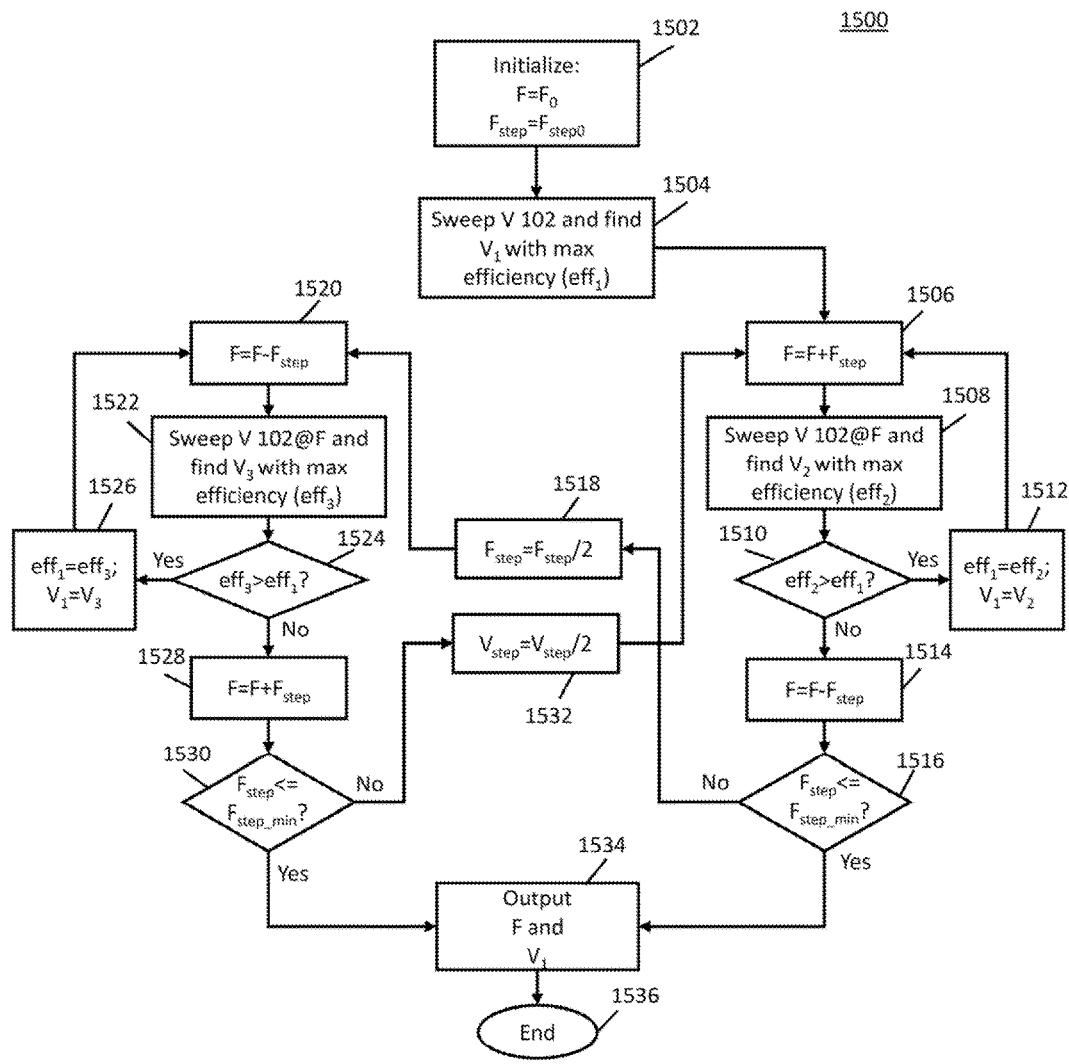
FIG. 15 shows an example of a diagram of a process for finding settings for V 102 and $F_{SWITCH}$ 202 by repeatedly setting values for $F_{SWITCH}$ and sweeping V 102 in accordance with some embodiments.

Turning to FIG. 15, an example 1500 of another process for finding values of V 102 and $F_{SWITCH}$ 202 based upon efficiency in accordance with some embodiments is shown. As illustrated, after the process begins, at 1502, the process can initialize $F_{SWITCH}$ 202 (which is shown in FIG. 15 as F for clarity) to any suitable initial setting $F_0$ and set $F_{step}$ (a step at which $F_{SWITCH}$ 202 will be changed) to any suitable initial setting $F_{step0}$.

Next, at 1504, the process can sweep V 102 at $F_{SWITCH}$ 202 and find $V_1$ with maximum efficiency ($eff_1$). Any suitable voltages or ranges of voltages can be swept.

At 1506, the process can increase $F_{SWITCH}$ 202 by $F_{step}$. Process 1500 can then sweep V 102 at $F_{SWITCH}$ 202 and find $V_2$ with maximum efficiency ($eff_2$) at 1508. Any suitable voltages or range of voltages can be swept. Next, at 1510, the process can determine if $eff_2$ is greater than $eff_1$. If so, the process can set $eff_1$ equal to $eff_2$ and set $V_1$ equal to $V_2$ at 1512, and then loop back to 1506. Otherwise, if at 1510, the process determines that $eff_2$ is not greater than $eff_1$, then the process can decrease $F_{SWITCH}$ by $F_{step}$ at 1514. After 1514, at 1516, the process can determine whether $F_{step}$ is less than or equal to a minimum step for $F_{SWITCH}$ ($F_{step\_min}$), which can have any suitable value (e.g., one at which the difference in $F_{SWITCH}$ does not result in different performance). If at 1516, it is determined that $F_{step}$ is not less than or equal to $F_{step\_min}$, process 1500 can divide $F_{step}$ in half at 1518 and then branch to 1520.

At 1520, the process can decrease $F_{SWITCH}$ 202 by $F_{step}$. Process 1500 can then sweep V 102 at $F_{SWITCH}$ 202 and find $V_3$ with maximum efficiency ($eff_3$) at 1522. Any suitable voltages or range of voltages can be swept. Next, at 1524, the process can determine if $eff_3$ is greater than $eff_1$. If so, the process can set $eff_1$ equal to $eff_3$ and set $V_1$ equal to $V_3$ at 1526, and then loop back to 1520. Otherwise, if at 1524, the process determines that $eff_3$ is not greater than $eff_1$, then the process can increase $F_{SWITCH}$ by $F_{step}$ at 1528. After 1528, at 1530, the process can determine whether $F_{step}$ is less than or equal to a minimum step for $F_{SWITCH}$ ($F_{step\_min}$), which can have any suitable value (e.g., one at which the difference in $F_{SWITCH}$ does not result in different performance). If at 1530, it is determined that $F_{step}$ is not less than or equal to $F_{step\_min}$, process 1500 can divide $F_{step}$ in half at 1532 and then branch to 1506.

If it is determined at 1516 or 1530 that $F_{step}$ is less than or equal to $F_{step\_min}$, then the process can output $V_1$ and $F_{SWITCH}$ at 1534, and then end at 1536.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter.

It should be understood that at least some of the above described blocks of the processes of FIGS. 3, 4, 14, and 15 can be executed or performed in any order or sequence not limited to the order and sequence shown in and described in the figures. Also, some of the above blocks of the processes of FIGS. 3, 4, 14, and 15 can be executed or performed substantially simultaneously where appropriate or in parallel to reduce latency and processing times. Additionally or alternatively, some of the above described blocks of the processes of FIGS. 3, 4, 14, and 15 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A voltage regulator system, comprising:
   a switched capacitor (SC) regulator that operates at a switching frequency and receives an input voltage; and
   a controller configured to control an operation of the SC regulator by:
   setting the input voltage to a first value;
   sweeping the switching frequency of the SC regulator while the input voltage has the first value to find a first maximum efficiency value of the SC regulator;
   setting the input voltage to a second value, wherein the second value is different from the first value;

sweeping the switching frequency of the SC regulator while the input voltage has the second value to find a second maximum efficiency value of the SC regulator; and comparing the first maximum efficiency value of the SC regulator to the second maximum efficiency value of the SC regulator.

2. The voltage regulator system of claim 1, further comprising one or more switches in series with the SC regulator.

3. The voltage regulator system of claim 1, wherein the SC regulator includes an output terminal that is coupled to a battery.

4. The voltage regulator system of claim 1, wherein the second voltage is larger than the first voltage by a step amount and wherein the controller also:

determines that the second maximum efficiency value is greater than the first maximum efficiency value;

in response to determining that the second maximum efficiency value is greater than the first maximum efficiency value:

sets the input voltage to a third value, wherein the third value is greater than the second value by the step amount;

sweeping the switching frequency of the SC regulator while the input voltage has the third value to find a third maximum efficiency value of the SC regulator; and compares the second maximum efficiency value of the SC regulator to the third maximum efficiency value of the SC regulator.

5. The voltage regulator system of claim 1, wherein the controller also:

determines that the second maximum efficiency value is less than the first maximum efficiency value;

in response to determining that the second maximum efficiency value is less than the first maximum efficiency value:

sets the input voltage to a fourth value, wherein the fourth value is less than the second value by a step amount;

sweeping the switching frequency of the SC regulator while the input voltage has the fourth value to find a fourth maximum efficiency value of the SC regulator; and compares the fourth maximum efficiency value of the SC regulator to the first maximum efficiency value of the SC regulator.

* * * * *